United States Patent [19]

Hirtle et al.

[11] Patent Number: 5,074,203
[45] Date of Patent: Dec. 24, 1991

[54] CORING APPARATUS

[75] Inventors: Thomas W. Hirtle, San Ramon; Frederick J. Cimperman, Castro Valley; Klaus Silbermann, Sunol, all of Calif.

[73] Assignee: Ashlock Company, San Leandro, Calif.

[21] Appl. No.: 595,382

[22] Filed: Oct. 10, 1990

Related U.S. Application Data

[62] Division of Ser. No. 229,160, Aug. 5, 1988, Pat. No. 5,009,909.

[51] Int. Cl.⁵ .............................................. A23N 3/00
[52] U.S. Cl. ...................................... 99/544; 99/547; 99/638; 99/642
[58] Field of Search ................. 99/538, 542, 544, 546, 99/547, 557, 558, 564, 638, 642, 643; 426/484, 481, 518

[56] References Cited

U.S. PATENT DOCUMENTS

| | | | |
|---|---|---|---|
| 1,066,233 | 7/1913 | Steelman et al. | 99/642 |
| 1,077,446 | 11/1913 | Wolfe | 99/642 |
| 1,500,085 | 7/1924 | Leavitt | 99/642 |
| 1,578,355 | 3/1926 | Olney . | |
| 1,815,730 | 7/1931 | Chapman et al. | 99/642 |
| 2,129,101 | 9/1938 | Polk, Jr. | 99/557 |
| 2,199,345 | 4/1940 | Polk, Sr. et al. | 99/547 |
| 2,252,951 | 8/1941 | Urschel et al. | 99/642 |
| 3,176,739 | 4/1965 | Minera . | |
| 3,434,517 | 3/1969 | Durand, Jr. et al. | 99/544 |
| 3,434,583 | 3/1969 | Belk . | |
| 3,490,506 | 1/1970 | Gilford . | |
| 3,612,123 | 10/1971 | Tomelleri . | |
| 3,612,124 | 10/1971 | Cunningham et al. . | |
| 3,754,470 | 8/1973 | Console . | |
| 3,886,857 | 6/1975 | Goodale . | |
| 3,907,101 | 9/1975 | Tomelleri . | |
| 4,094,412 | 6/1978 | Hoppmann et al. . | |
| 4,099,456 | 7/1978 | Cornish . | |
| 4,157,681 | 6/1979 | Akesson et al. . | |
| 4,176,595 | 12/1979 | Shaw . | |
| 4,211,161 | 7/1980 | Jourdan et al. . | |
| 4,241,096 | 12/1980 | Shaw . | |
| 4,453,458 | 6/1984 | Altman . | |
| 4,581,990 | 4/1986 | Matsumoto | 99/538 |

FOREIGN PATENT DOCUMENTS 1300522  6/1962  France ............................. 99/544
2410967  8/1979  France .

OTHER PUBLICATIONS

Herbort Inc. brochure entitled "Cauliflower Segmenter 211A", date unknown.

Primary Examiner—Timothy F. Simone
Attorney, Agent, or Firm—Limbach, Limbach & Sutton

[57] ABSTRACT

An apparatus for severing fragments (such as fleurettes) from a one-piece core of an article, such as a cauliflower, as the article is translated between stations along a process path. In a preferred embodiment, the article is translated through a sequence of stations, including a coring station, along the process path. At the coring station, the article is held in a fixed position by an impaling knife or pin, while one or more rotating coring knives are lowered into engagement with the article by a pivoting arm mechanism. The pivoting arm mechanism causes each rotating knife to trace out a generally helical path as it cores the article.

31 Claims, 18 Drawing Sheets

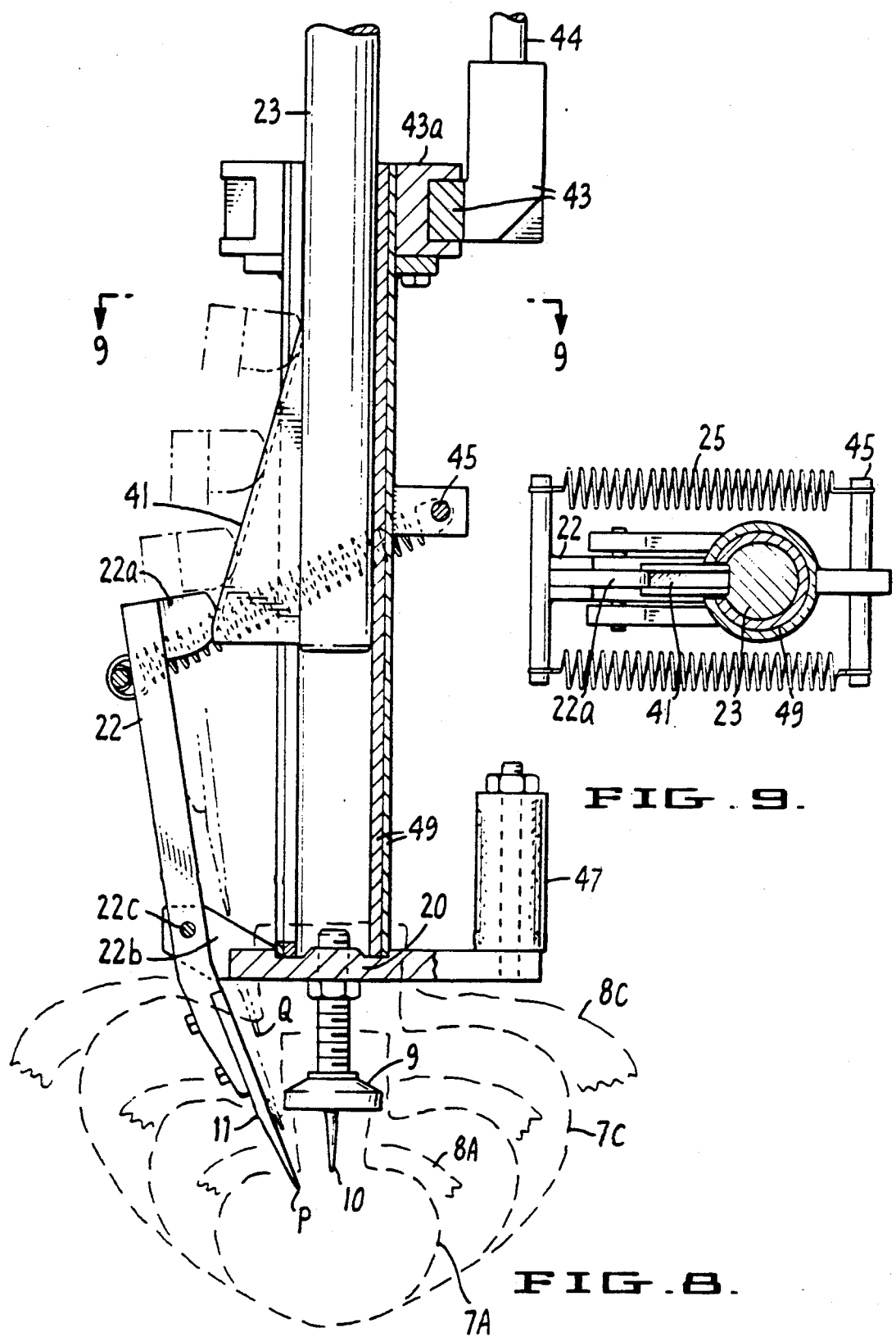

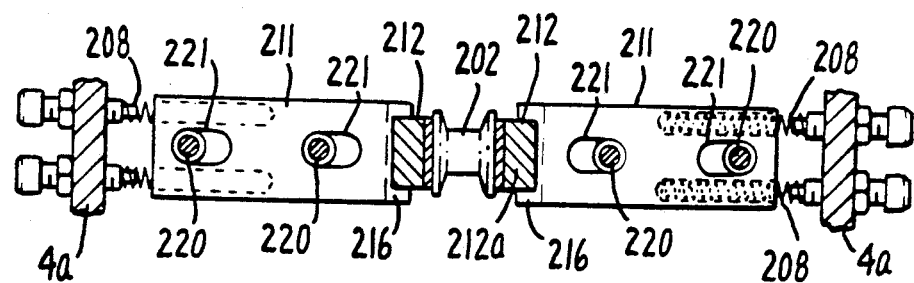
FIG.24.
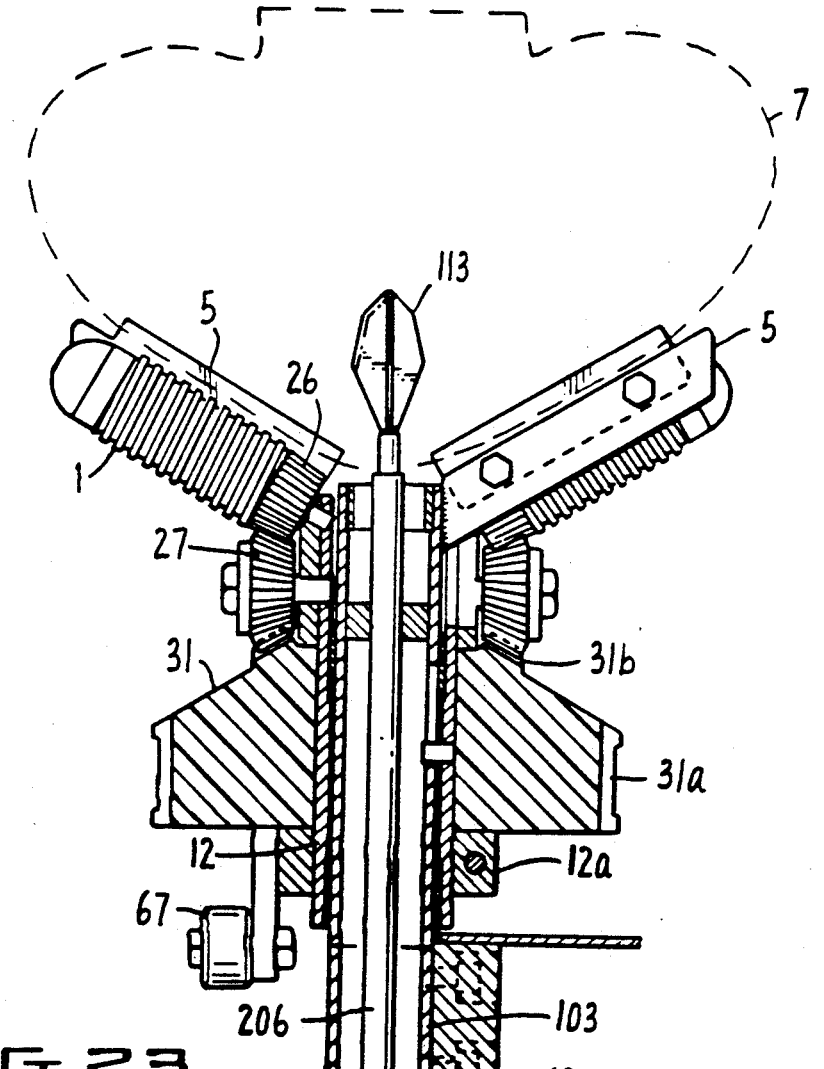
FIG.23.
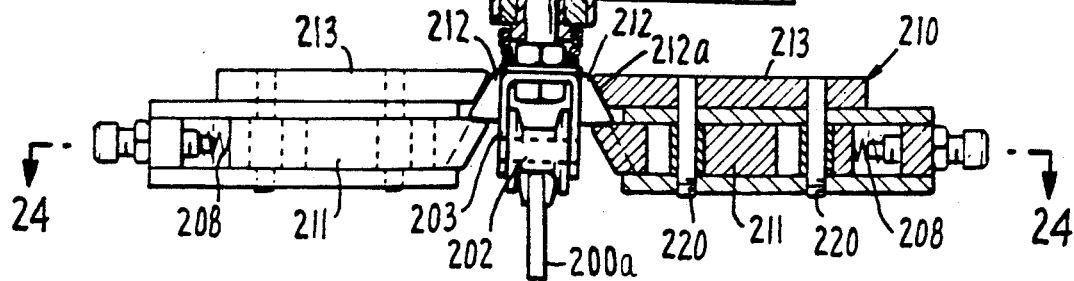

CORING APPARATUS

This is a divisional of application Ser. No. 7/229,160, filed 08/05/88, now U.S. Pat. No. 5,009,909.

FIELD OF THE INVENTION

The invention is a method and apparatus for coring an article such as a cauliflower. More particularly, the invention is a method and apparatus capable of aligning an article, such as a cauliflower, and removing a one-piece core from the aligned article.

BACKGROUND OF THE INVENTION

One type of conventional fruit or vegetable product coring machine defines a core in the product by employing rotating knives to remove fragments (or shavings) from the product's core region. However, such machines have the disadvantage that they do not remove a one-piece core, which is typically more valuable than a collection of core fragments.

Another type of conventional coring machine is capable of removing a fixed-diameter one-piece core from a fruit or vegetable product. However, such machines have the disadvantage that they cannot automatically adjust the diameter of the severed core material. It would be desirable to automatically adjust the severed core diameter so that the machines could be employed to core products of varying size.

Another problem with conventional coring machines arises because the products to be cored must first be aligned with a coring knife assembly. In the process of loading the products onto the machines, their orientations are usually randomized. Conventional coring machines have employed undesirably complicated product alignment mechanisms, such as retracting arm assemblies.

It has not been known until the present invention how to remove a one-piece core from a product, so that the size of the severed core varies automatically with variations in the size of the product to be cored, with a coring machine employing a simple product alignment mechanism.

SUMMARY OF THE INVENTION

The invention is a method and apparatus for removing a one-piece core from an article, such as a cauliflower, as the article is translated between stations along a process path. Preferably, the article is translated along a closed path by a rotary table, although alternatively, a multi station, in-line, conveyor unit may be employed to translate the article between stations along a linear process path. Preferably, the article is first aligned, and the one-piece core is then removed from the aligned article. During processing, the articles are translated between stations along a process path by a rotary table or in-line conveyor system. In a preferred embodiment, the articles are loaded on a rotary table at a first station, then deleafed (or otherwise trimmed) at a second station, then aligned by a set of alignment rollers while translating through third and fourth alignment stations, then cored at a fifth coring station, and finally unloaded at a sixth station.

In a preferred embodiment of the coring station, the article is held in a fixed position by an impaling pin while a set of rotating coring knives are lowered into engagement with the article by a pivoting arm mechanism. The coring knife assembly may include one or more coring knives. The pivoting arm mechanism causes each rotating knife to trace out a generally helical path as it cores the article. The radius of the helical path preferably decreases as the coring knife assembly is lowered, so that the coring knife assembly severs a one-piece tapered core from the article. In such embodiment, the system of the invention removes a one-piece core whose size will vary automatically with variations in the size of the article being cored, so that the invention is capable of coring articles having a wide range of heights and diameters without adjustment.

The alignment mechanism of the invention includes a product holder having a set of holding knives and a set of alignment rollers. As the rotary table translates the product holder from station to station around the closed process path, the alignment rollers follow a cam track. At desired positions along the process path, the alignment rollers are raised by the cam track so that they bear the weight of any article in the holder. At other desired positions along the process path, the alignment rollers are lowered below the holding knives, so that the holding knives bear the weight of any article within the holder, so that the holding knives will hold the article fixed with respect to the holder. Each roller preferably has a threaded, helical surface. The rollers are rotated so that their threads exert a frictional force on any article within the holder, urging the article into a vertical alignment.

In one preferred embodiment, the impaling pin comprises part of the coring knife assembly, and may be extended downward from above the article to impale the article. In another preferred embodiment, an impaling knife is mounted within each product holder, and may be extended upward from below the article to impale the article.

BRIEF DESCRIPTION OF THE DRAWINGS

FIG. 8 is a side elevational view of a preferred embodiment of a single blade deleafing knife assembly for use in the inventive apparatus.

FIG. 9 is a cross-sectional view of the FIG. 8 apparatus, in the horizontal plane defined by line 9—9 in FIG. 8.

FIG. 23 is a partially side-elevational, partially cross-sectional view, in a vertical plane, of a combined product holder and impaling knife assembly of the type employed in the FIG. 20 apparatus, with the impaling knife in an extended position.

FIG. 24 is a cross-sectional view of the FIG. 23 assembly, in the horizontal plane defined by line 24—24 of FIG. 23.

DETAILED DESCRIPTION OF THE PREFERRED EMBODIMENTS

The six processing stations of a preferred embodiment of the inventive apparatus will be described with reference to FIG. 1. At loading station A, the article to be cored (cauliflower 7 in FIG. 1) is loaded onto a product holder comprising alignment rollers 1, support shaft 3, and holding knives 5.

It is contemplated that any of a wide variety of articles may be processed by the inventive apparatus. However, for specificity, the invention will be described in a preferred embodiment dimensioned to process cauliflowers. Such preferred embodiment of the inventive apparatus is arranged so that the cauliflowers are positioned with their stems oriented generally upward.

Figure 1:
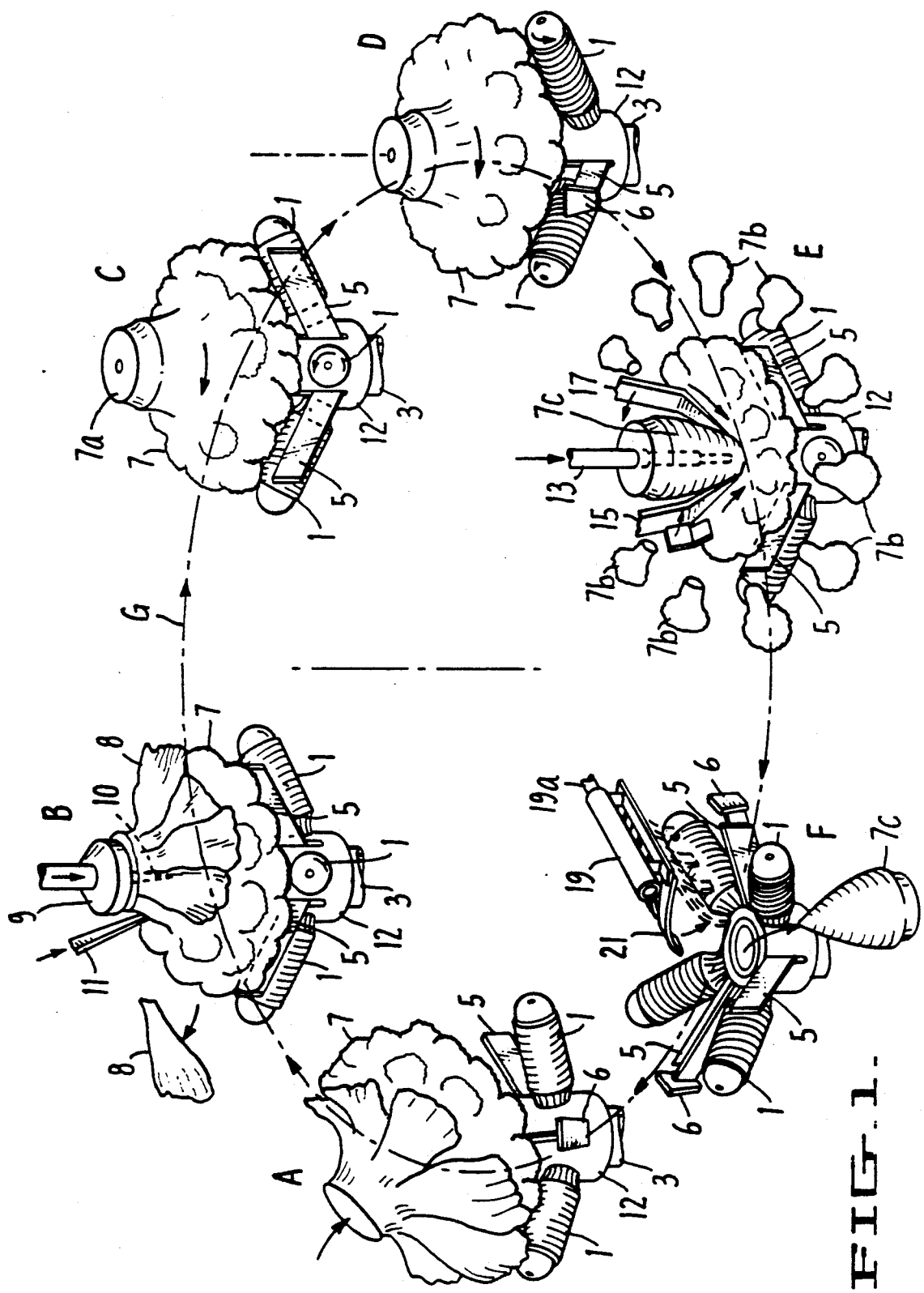
FIG. 1 is a perspective view of the six processing stations of several important components of an apparatus embodying a preferred embodiment of the invention.

The product holder, containing cauliflower 7, is translated from station A to station B along closed loop G by a conveyor unit (not shown in FIG. 1). The conveyor unit may be a rotary table. At station B, hold-down pin 10 is driven into the stem of cauliflower 7 by hold-down member 9. While member 9 and pin 10 hold cauliflower 7 in a stationary position against holding knives 5, rotating deleafing knife 11 is brought into engagement with cauliflower 7 to remove leaves 8 from cauliflower 7.

As the rotary table translates the product holder along loop G to stations C and D, alignment rollers 1 are raised above the level of holding knives 5 so that cauliflower 7 rests on alignment rollers 1. Each of rollers 1 has a threaded surface. In the FIG. 1 embodiment, each roller 1 has a left-handed threaded surface, so that when rotated counter-clockwise (as shown in FIG. 1), the threaded surface will urge the portion of cauliflower 7 resting thereon inward toward the central axis of support shaft 3. During the time that the product holders are stationary at stations C and D, and while the product holder translates from station C to station D, each of rollers 1 is rotated so that its threads exert a frictional force on cauliflower 7. The combined frictional force exerted by all rollers 1 tends to urge the cauliflower into a vertically aligned position.

It is desirable to have two (rather than one) alignment stations C and D so that, although the rotational speed of rollers 1 is low, rollers 1 will act on cauliflower 7 for a sufficiently long period to urge cauliflower 7 into the desired vertical orientation. Additionally, provision of two (rather than one) alignment stations allows more time for small cauliflower fragments and green leaves 8 to fall away from cauliflower 7 before cauliflower 7 reaches subsequent processing station E.

As the product holder is translated between station D and coring station E, alignment rollers 1 are lowered as they ride off the cam track (not shown in FIG. 1) and holding knives 5 now bear the weight of cauliflower 7. At station E, stepped impaling pin 13 penetrates cauliflower 7 to hold it fixed in a substantially vertical orientation against holding knives 5. At the same time, rotating coring knives 15 and 17 sever fleurettes 7b from core 7c of cauliflower 7. Fleurettes 7b are discharged through a chute below station E.

The rotary table then translates the product holder to unloading station F. While the product holder translates to station F, alignment rollers 1 are partially raised by cam 65a. At station F, ejector 21 swings into engagement with cauliflower core 7c to discharge core 7c from the product holder. Ejector 21 then retracts to its original position before the product holder translates from station F to loading station A. Alignment rollers 1 return to their lowered position as the rotary table translates the product holder back to station A, where the product holder may receive a new cauliflower.

In alternative embodiments, the product holders may be mounted on a multi-station, in-line conveyor, so that the conveyor (with product holders) may be translated between stations along a linear process path by a Geneva drive mechanism. In yet another set of alternative embodiments, the Geneva drive mechanism may be replaced by a continuous drive means for continuously translating the conveyor (with product holders) along such a linear processing path.

Figure 2:
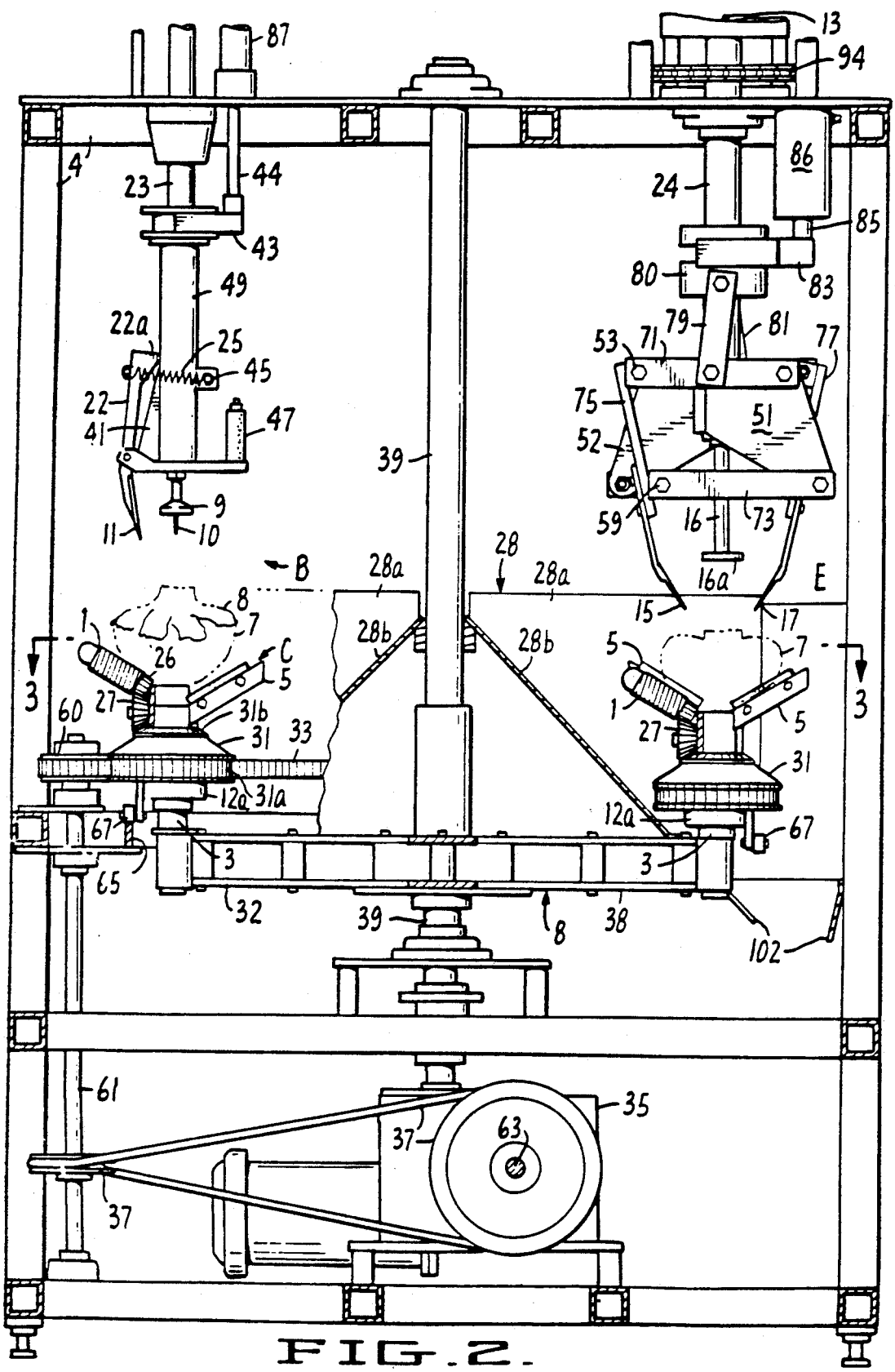
FIG. 2 is a partially cross-sectional, partially side elevational view, in a vertical plane, of the lower portion of an apparatus including the components shown in FIG. 1.

FIG. 2 is a cross-sectional view, in a vertical plane, of the apparatus described with reference to FIG. 1. Rotary table 8 comprises arms 32 and 38 (and also four additional arms 34, 36, 40, and 42 shown in FIG. 3 but not in FIG. 2). Rotary table 8 is fixedly mounted on shaft 39 and supports six identical product holders. Each product holder includes a set of alignment rollers 1, a support shaft 3, a set of holding knives 5, and a rotating member 31. Shaft 39 is rotatably mounted between frame 4 and Geneva drive mechanism 35. Mechanism 35 drives shaft 39 and rotary table 8 through six successive stations about the axis of shaft 39, so that each product holder successively occupies each station as the product holders translate along a closed circular path around shaft 39.

Each of six identical station dividers 28 is fixedly mounted between shaft 39 and one of the arms of rotary table 8, so that each divider 28 rotates as a unit with the arm on which it is mounted. Each station divider 28 includes a generally vertical portion 28a and an inclined portion 28b for confining any product fragments (such as cauliflower fleurettes 7b) or leaf fragments, and directing such fragments to a desired location below rotary table 8, for example, so that they fall into a bin or chute below the rotary table. Chute members 102, mounted on frame 4 and on the rotary table, serve to direct product fragments to a desired location below the rotary table.

Figure 7:
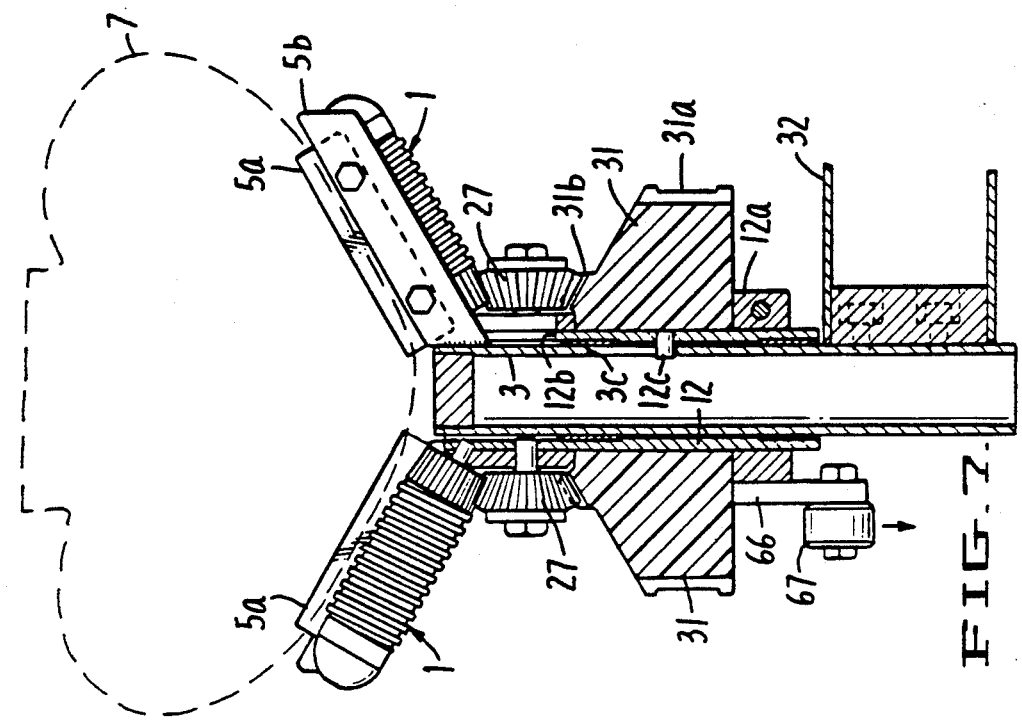
FIG. 7 is a side cross-sectional view of the holder shown in FIG. 6, in a lowered position.
Figure 6:
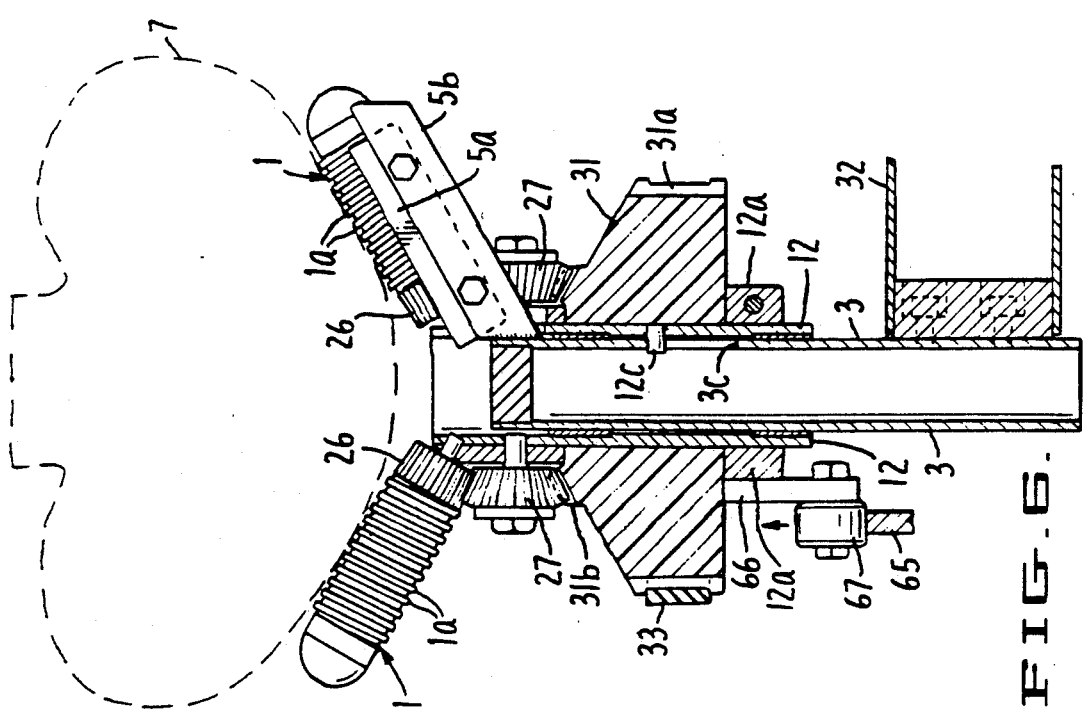
FIG. 6 is a side cross-sectional view, along section 6—6 of FIG. 4, of a product holder of a preferred embodiment of the invention in a raised position.

Rotating member 31 of each product holder is mounted on tube 12 in a manner so as to be free to rotate as a unit with tube 12 about the vertical axis defined by tube 12 and to translate vertically relative to shaft 3. Drive mechanism 35 rotates shaft 63 about shaft 63's horizontal axis. The rotation of shaft 63 is translated via drive transmission 37 to rotation of shaft 61 about shaft 61's vertical axis. Sprocket (or pulley) 60, fixedly mounted at the upper end of shaft 61, rotates belt 33 in a horizontal plane. Belt 33 has a toothed surface which engages with toothed surface 31a of rotating member 31 (when rotating member 31 occupies one of the alignment stations C or D) to rotate member 31 about its vertical axis at stations C and D and while shaft 39 translates shaft 3 and member 31 between the stations. Rollers 1 (each having a toothed end 26), and a gear 27 for each roller 1, are rotatably mounted on tube 12 (as shown in FIG. 6 and 7). As belt 33 rotates member 31 relative to tube 12, toothed surface 31b of member 31 rotates tapered gear 27 about a horizontal axis. Each of gears 27 in turn rotates the roller 1 whose toothed end 26 is engaged therewith.

Each holding knife 5 is rigidly connected to shaft 3. Gear 31 is rotatably mounted on tube 12 and member 12a (shown in FIGS. 6 and 7) Tube 12 and member 12a are in turn rigidly connected to member 66. Cam follower 67 is rotatably mounted at the end of member 66 so that cam follower 67 may roll on cam track 65. Each roller 1 is thus free to translate vertically, relative to shaft 3 and holding knives 5, as member 66 translates tube 12 vertically relative to shaft 3. Thus, when cam follower 67 and member 66 push tube 12 upward, as cam follower 67 rolls along track 65 (for example, at alignment stations C and D), rollers 1 are pushed upward into a raised position above the level of knives 5. When cam follower 67 and member 66 allow tube 12 to drop downward (for example, at stations A, B, and E), rollers 1 drop downward into a lowered position below the level of knives 5. A preferred arrangement for mounting rollers 1 and knives 5 will be discussed in greater detail below with reference to FIGS. 6 and 7.

The deleafing assembly including hold-down member 9, hold-down pin 10, and rotating deleafing knife 11 is suspended from frame 4 by shaft 23. Shaft 23 is rotatably mounted to frame 4, and is driven so as to rotate knife 11, in a manner to be discussed in greater detail below with reference to FIGS. 8 and 17. Shaft 23 is positioned so that the common central longitudinal axis of shaft 23 and pin 10 intersect station B, so that the axis of shaft 23 is located above the plane of FIG. 2 (i.e., out of the page with respect to the axis of the station C product holder shown in FIG. 2). Knife 11 is attached to knife support 22. The assembly comprising tube 49, counterweight 47, wedge member 41, spring 25, member 9, pin 10, support 22, and knife 11 rotates as a unit with shaft 23. A pneumatic control means, including air cylinder 87 (shown in FIG. 17), rod 44, and members 43 and 43a, is provided for translating the rotating subassembly including tube 49, spring 25, member 9, pin 10, support 22, and knife 11 vertically relative to the vertically fixed assembly comprising shaft 23, wedge 41, and counterweight 47. Spring 25 exerts a force maintaining upper end 22a of support 22 in contact with wedge member 41 as tube 49, spring 25, support 22, and knife 11 translate vertically relative to wedge member 41 and shaft 23.

The pneumatic control means drives pin 10 downward into the stem of cauliflower 7, while pin 10 holds cauliflower 7 in a stationary position against holding knives 5. The pneumatic control means simultaneously drives rotating knife 11 downward relative to wedge 41 and shaft 23 to penetrate the surface of cauliflower 7 to remove leaves 8 from cauliflower 7. When stem-end sensing member 9 reaches the cauliflower stem's end face, pressure sensor 87b mounted on air cylinder 87 sends a signal to the pneumatic control means to cause the pneumatic control means to raise the rotating subassembly upward out of engagement with the cauliflower. Geneva mechanism 35 then rotates table 8 to translate the product holder carrying deleafed cauliflower 7 to alignment station C.

The coring assembly including coring knives 15 and 17 is suspended from frame 4 by shaft 24. Shaft 24 is rotatably mounted to frame 4, and is driven so as to rotate knives 15 and 17, in a manner to be discussed in greater detail below with reference to FIGS. 10–12 and 17. Shaft 24 is positioned so that the common central longitudinal axis of shaft 24 intersects station E. Knives 15 and 17 are attached to knife supports 75 and 77, respectively. The assembly comprising sliding member 80, arms 71, 73, and 79, members 51, 52 and 78, stripper tube 16, supports 75 and 77, and knives 15 and 17 rotates as a unit with shaft 24. A pneumatic control means, including air cylinder 86, rod 85, and member 83, is provided for translating the entire rotating assembly including sliding member 80, arms 71, 73, and 79, members 51, 52, and 78, supports 75 and 77, and knives 15 and 17 vertically relative to shaft 24, stripper tube 16, and frame 4.

At station E, air cylinder 88 (to be described with reference to FIG. 17) drives impaling pin 13 downward into the stem of cauliflower 7, pushing the cauliflower down onto the holding knives 5. While pin 13 holds cauliflower 7 in a stationary position against holding knives 5, the pneumatic control means including air cylinder 86 drives the rotating assembly including coring knives 15 and 17 downward to penetrate the surface of cauliflower 7. Knives trace out an inwardcurving path within cauliflower 7 as they rotate and descend, to sever the fleurettes 7b from the cauliflower 7, leaving a one-piece core 7c. Following the coring operation, the pneumatic means including air cylinder 86 raises the rotating assembly including knives 15 and 17 out of engagement with the cauliflower core, and air cylinder 88 retracts impaling pin 13 upward within stripper tube 16. Stripper plate 16a at the end of tube 16 strips the cauliflower core 7c from pin 13 as pin 13 retracts upward.

During the coring operation, the cauliflower fragments (fleurettes) severed from the core are guided by members 28a, 28b, and 102 to a desired location below table 8. After the coring operation, rotary table 8 translates the product holder (with the cauliflower core) to core ejection station F.

Figure 3:
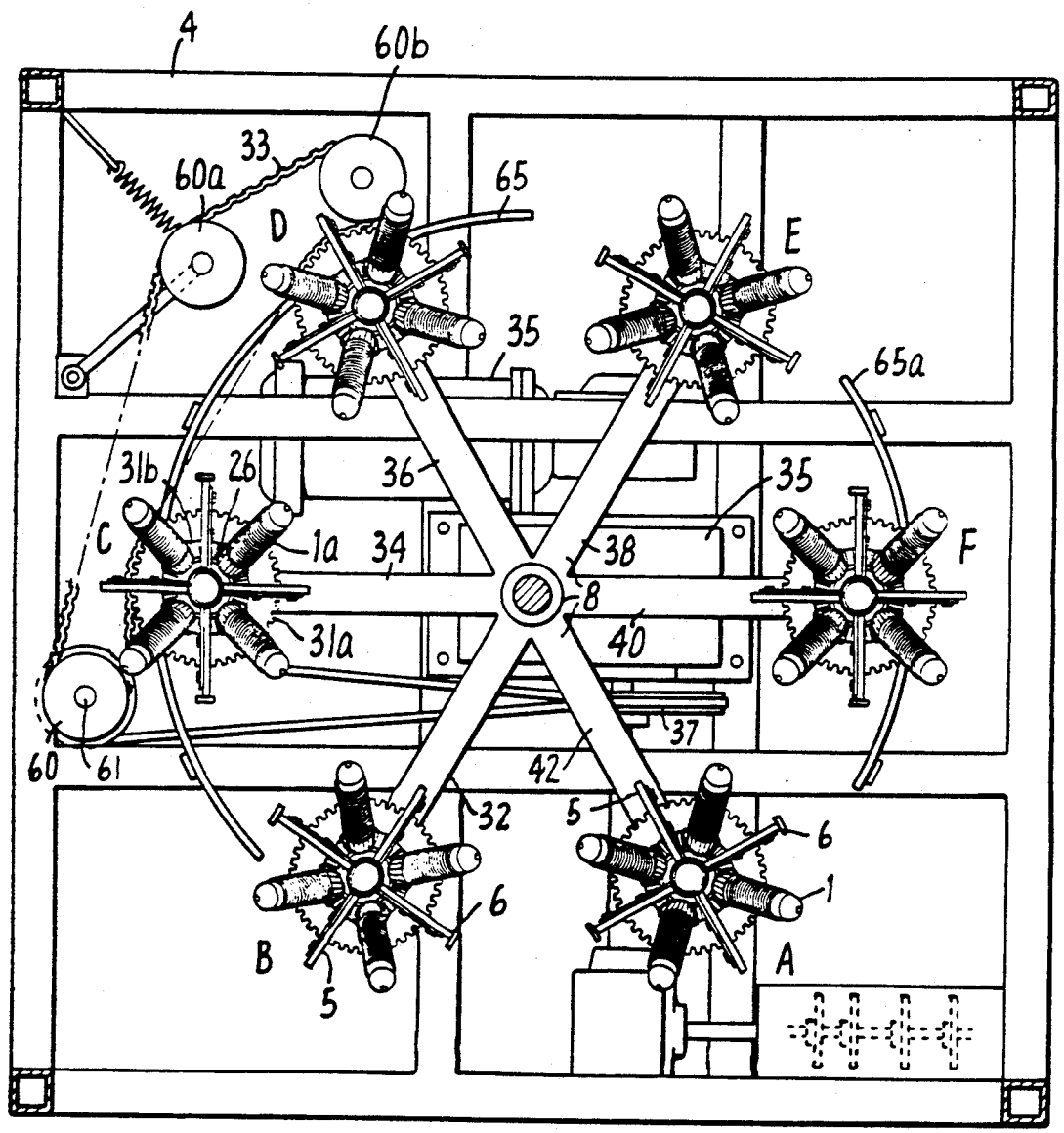
FIG. 3 is a cross-sectional view of the apparatus shown in FIG. 2, in the horizontal plane defined by line 3—3 in FIG. 2.

FIG. 3 is a cross-sectional view of the FIG. 2 apparatus in the horizontal plane determined by line 3—3 in FIG. 2. The deleafing assembly including knife Il is positioned above deleafing station B, the coring assembly including knives 15 and 17 is positioned above coring station E, and the core ejection assembly including ejection member 21 is positioned adjacent station F. Geneva drive mechanism 35 rotates shaft 39 and table 8 clockwise, through each of six positions during each operating cycle. Each of arms 32, 34, 36, 38, 40, and 42 occupies a different one of stations A through F in each of the six positions.

At stations A, B, and E, rollers 1 are in their lowered position so that knives 5 bear the weight of any articles in the product holders occupying such stations. Thus, holding knives 5 will hold such articles fixed relative to the product holders at these stations. At stations C and D (and positions adjacent stations C and D) and station F (and positions adjacent station F) when each product holder is located above cam track 65 (or 65a), the product holder's cam track follower 67 engages track 65 (or 65a). As track 65 (or 65a) rises upward, and cam follower 67 accordingly rolls upward as it rides on track 65 (or 65a), rollers 1 will rise upward above knives 5 so that rollers 1 will support any article within the product holder. Also at stations C and D, each product holder encounters belt 33, which is looped around sprockets 60, 60a, and 60b. Sprocket 60 is driven by shaft 61 (shown in FIG. 2) in order to translate belt 33 along a clockwise path. When toothed surface 31a of product holder gear 31 engages belt 33, belt 33 will rotate gear 31 counter-clockwise. Thus, toothed surface 31b of gear 31 will engage and rotate each tapered gear 27 counter-clockwise; and gear surfaces 27a will engage each roller's toothed end 26 to rotate each roller 1 clockwise. Left-handed threads 1a of each roller 1 will thus displace any article within the product holder inward toward the product holders central axis. The combined action of threads la of the four rollers 1 of each product holder will thus urge a generally rotationally symmetric article (such as a cauliflower) into a position with its axis of symmetry vertically aligned.

As each product holder moves from station D to station E, the rollers 1 will again move downward into their lowered position so that knives 5 will hold each aligned article fixed in its aligned position for subsequent processing.

Figure 4:
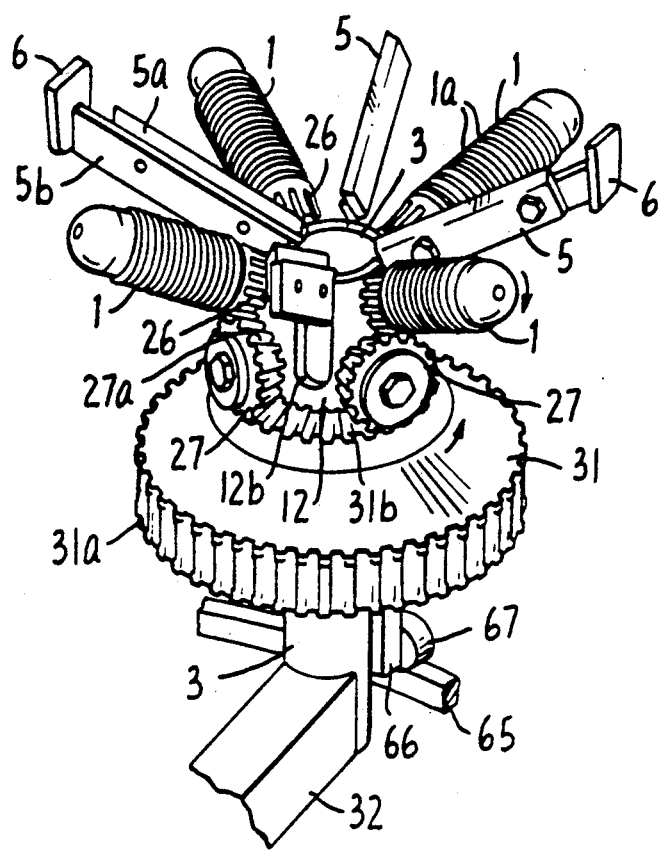
FIG. 4 is a perspective view of a product holder of the apparatus shown in FIG. 2.
Figure 5:
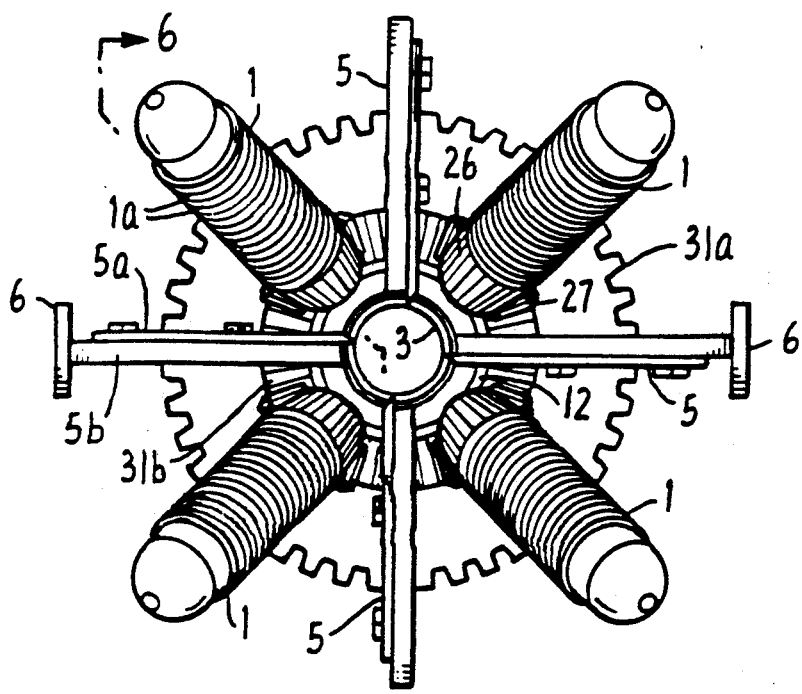
FIG. 5 is a plan view of the holder shown in FIG. 4.

FIGS. 4 and 5 each show a preferred embodiment of the product holder of the invention. Shaft 3 is fixedly attached to the end of arm 32 of table 8 (or to one of the other arms of table 8). Gear 31 is rotatably mounted on tube 12. Rollers 1 are rotatably mounted on tube 12, so that each roller 1 may rotate about its own longitudinal axis. Tube 12 is mounted on shaft 3 in a manner so that the assembly comprising tube 12, gear 31, gears 27 and rollers 1, is free to translate vertically relative to shaft 3, but so that only gear 31 (not tube 12 and rollers 1 ) may rotate relative to shaft 3 about shaft 3's axis. Each of tapered gears 27 is engaged with gear 31 and with a toothed end 26 of one of rollers 1, so that when gear 31 rotates relative to shaft 3 and tube 12, tapered gears 27 will transform rotational motion of gear 31 about the axis of shaft 3 into rotational motion of rollers 1 about the axes of rollers 1. Rollers 1 and gear 31 are preferably formed of a durable plastic such as Delrin or UHMW plastic, tapered gears 27 are preferably made of non-corrosive metal.

Each of holding knives 5 comprises a blade 5a fixedly attached to a blade holder 5b. Four holding knives 5 and four rollers 1 are shown in the FIG. 4 embodiment, although other embodiments of the invention may including more than or less than four rollers or holding knives. End members 6 are preferably attached to the ends of at least one pair of opposed blade holders 5b in-line with the rotational path G. Blade holders 5b are rigidly attached to shaft 3, so as to extend outward from shaft 3 through slots 12b in tube 12.

FIG. 5 shows holding knives 5 attached to shaft 3, and tube 12 coaxially mounted around shaft 3.

The manner in which gear 31 moves relative to shaft 3 is best understood with reference to FIGS. 6 and 7. FIG. 6 is cross-sectional view of the FIG. 5 product holder assembly, taken along section 6—6 of FIG. 5.

Tube 12 and member 12a are fixedly attached to holding knife support member 66. Cam follower 67 is rotatably mounted at the end of support member 66, so that as cam follower 67 rolls along cam track 65, member 66 is capable of causing tube 12 to translate between raised and lowered positions relative to shaft 3. Gear 31 is supported by support member 66 and member 12a, so that gear 31 will rise and fall vertically as a unit with shaft 12. Pin 12c of tube 12 translates in slot 3c of shaft 3, so that the vertical extent of slot 3c limits the relative vertical motion of tube 12 and shaft 3. Gear 31 is free to rotate about the common vertical axis of shaft 3 and tube 12, although tube 12 is not free to rotate relative to shaft 3 about shaft 3's axis because of the engagement of pin 12c in slot 3c.

In FIG. 6, the assembly comprising support member 66, tube 12, and gear 31 is in its raised position, in which pin 12c prevents further upward motion of the assembly. In this raised position, rollers 1 bear the weight of article 7.

The FIG. 7 assembly is identical to the FIG. 6 assembly, except that in FIG. 7, the assembly is in its lowered position, in which pin 12c prevents further downward motion of member 66, tube 12, and gear 31. In this lowered position, holding knife blades 5a of knives 5 bear the weight of article 7.

Figures 13, 14:
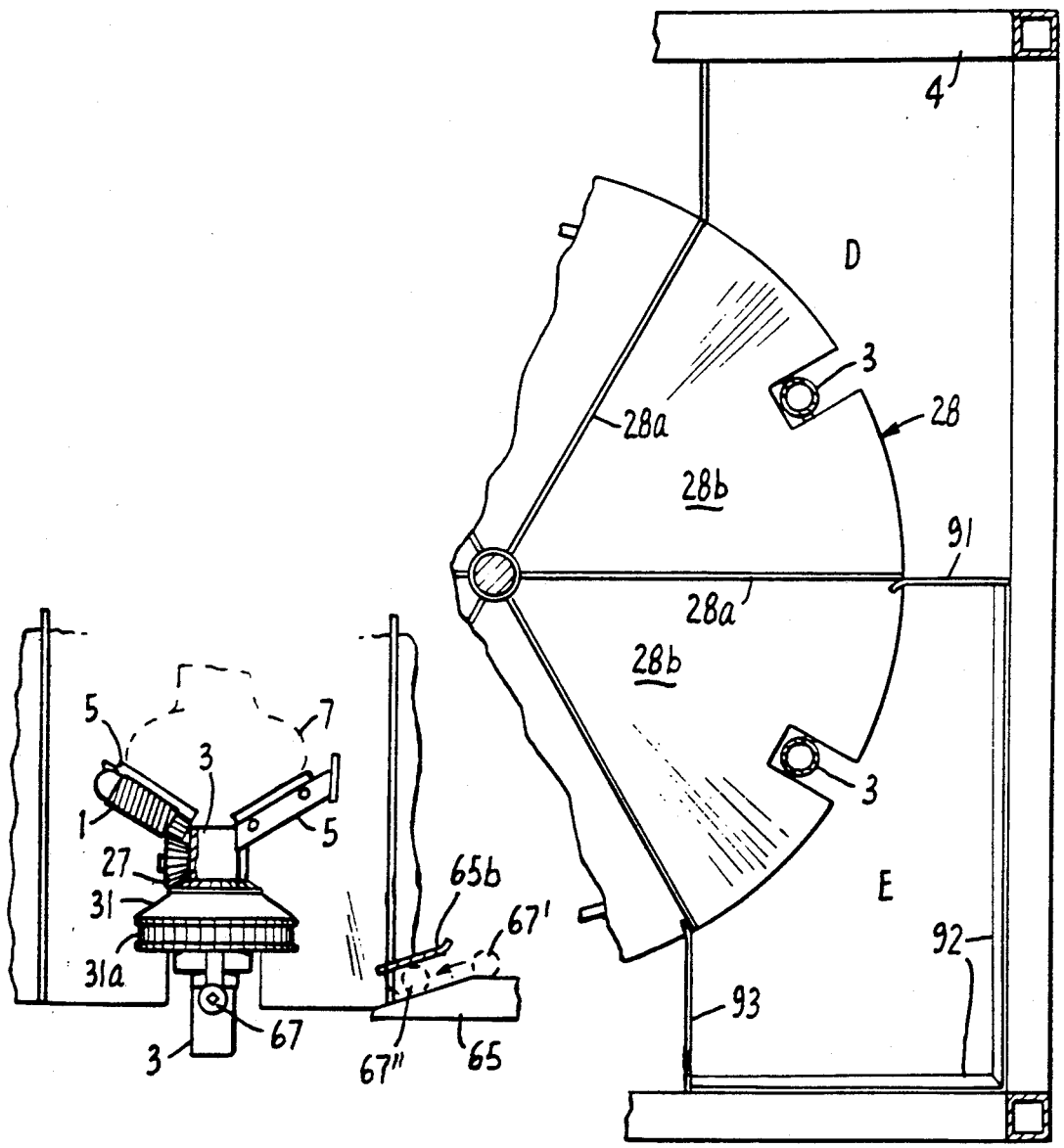
FIG. 13 is a side elevational view of a portion of the FIG. 2 apparatus, showing part of the cam track guiding the product holders during operation of the apparatus.
FIG. 14 is a cross-sectional view, in a horizontal plane, of a portion of the FIG. 2 apparatus.

FIG. 13 is another view of the FIG. 7 product holder assembly in its lowered position. When cam follower 67 is in position 67' (shown in phantom view) on track 65, rollers 1 would be in their raised position. As rotary table 8 translated the product holder to the left in FIG. 13, guide member 65b positioned along track 65 would have urged cam follower downward into position 67" (shown in phantom view) along track 65. After reaching the left-most end of track 65, the force of gravity retains the roller assembly (comprising rollers 1 and gear 31) in its lowered position (with cam follower 67 in the position shown) while pin 12c prevents further downward motion of the roller assembly.

FIG. 8 is a side elevational view of a preferred embodiment of a single blade deleafing knife assembly for use in the inventive apparatus. The deleafing assembly includes hold-down member 9, hold-down pin 10, and rotatable deleafing knife 11 mounted on shaft 23. Shaft 23 is rotatably attached to frame 4 (shown in FIG. 2), and is driven so as to rotate knife 11 about the axis of shaft 23. Knife 11 is fixedly attached to knife support 22. Tube 49 is coaxially and slidably mounted around shaft 23, but is not free to rotate relative to shaft 23 about shaft 23's longitudinal axis. Wedge member 41 is fixedly attached to shaft 23, as is shown in FIG. 9, so that tube 49 is free to translate vertically with respect to member 41 and shaft 23. The assembly comprising tube 49, wedge member 41, spring 25, member 9, pin 10, support 22, and knife 11 rotates as a unit with shaft 23 about shaft 23's axis. A pneumatic control means, including air cylinder 87 (shown in FIG. 17), rod 44, and yoke member 43 and sliding jaw 43a, is provided for vertically translating the rotating sub-assembly including tube 49, spring 25, member 9, pin 10, support 22, and knife 11 relative to the vertically fixed assembly comprising shaft 23 and wedge 41. Sliding jaw 43a is fixedly attached to tube 49. Yoke 43 fits within a groove on the surface of sliding jaw 43a, so that as yoke 43 translates vertically relative to shaft 23, yoke 43 will translate sliding jaw 43a and tube 49 vertically as a unit relative to shaft 23.

Spring 25 extends between spring anchor 45 and knife support 22. Spring 25 exerts a force maintaining upper end 22a of support 22 in contact with wedge member 41 as tube 49, spring 25, support 22, and knife 11 translate vertically relative to wedge member 41 and shaft 23. Counterweight 47 is fixedly mounted on member 20, which is in turn fixedly attached to the lower end of tube 49, opposite support member 22b.

Stem-end sensing member 9 is fixedly attached to member 20. Pin 10 is mounted on member 9. In operation, the pneumatic control means drives tube 49, member 20, and pin 10 downward so that pin 10 penetrates into the stem of a cauliflower (such as cauliflower 7A or 7C) until stem-end sensing member 9 is engaged with the end face of the cauliflower stem. Support member 22 is pivotally attached to support member 22b by pin 22c. Member 22b is fixedly attached to member 20. As the pneumatic control means drives tube 49 and member 20 downward relative to wedge 41, member 22b pulls member 22 downward (so that end portion 22a rides downward along the outer surface of wedge 41). Thus, knife 11 is directed downward along an inward-spiralling path (whose radius decreases as knife 11 moves downward) as knife 11 penetrates the upper surface of a cauliflower (such as cauliflower 7A or 7C) in one of the product holders.

Throughout this Specification, the phrase "generally helical path" will be used to denote any spiralling path in the broad class including true helical paths (which lie on a cylinder) and spiralling paths which lie on a conical surface or a curved surface of revolution (such as a surface of revolution defined by rotating an ellipse about its axis of symmetry).

As knife 11 penetrates a short distance into the cauliflower, and simultaneously rotates as a unit with shaft 23 and tube 49, it will sever the leaves (8A or 8C) from the cauliflower (7A or 7C) while pin 10 holds the cauliflower in a stationary position against holding knives 5.

Wedge 41 and support member 22 are shaped so that knife 11 will enter a small cauliflower (such as cauliflower 7A) at an inner radial position, P, near the longitudinal axis of pin 10, and so that knife 11 will enter a large cauliflower (such as cauliflower 7C) at an outer radial position, Q, farther from the longitudinal axis of pin 10. When stem-end sensing member 9 reaches the end-face of the cauliflower stem, pressure sensor 87b mounted on cylinder 87 sends a signal to the pneumatic control means to cause the pneumatic control means to raise the rotating deleafing sub-assembly (which includes knife 11) upward out of engagement with the cauliflower. As the rotating deleafing assembly rises, knife 11 traces out a generally helical path (which may be a spiralling path lying on a conical surface, and whose radius increases as knife 11 rises upward). A suitable pressure sensor 87b may be selected from those commercially available.

Figure 10:
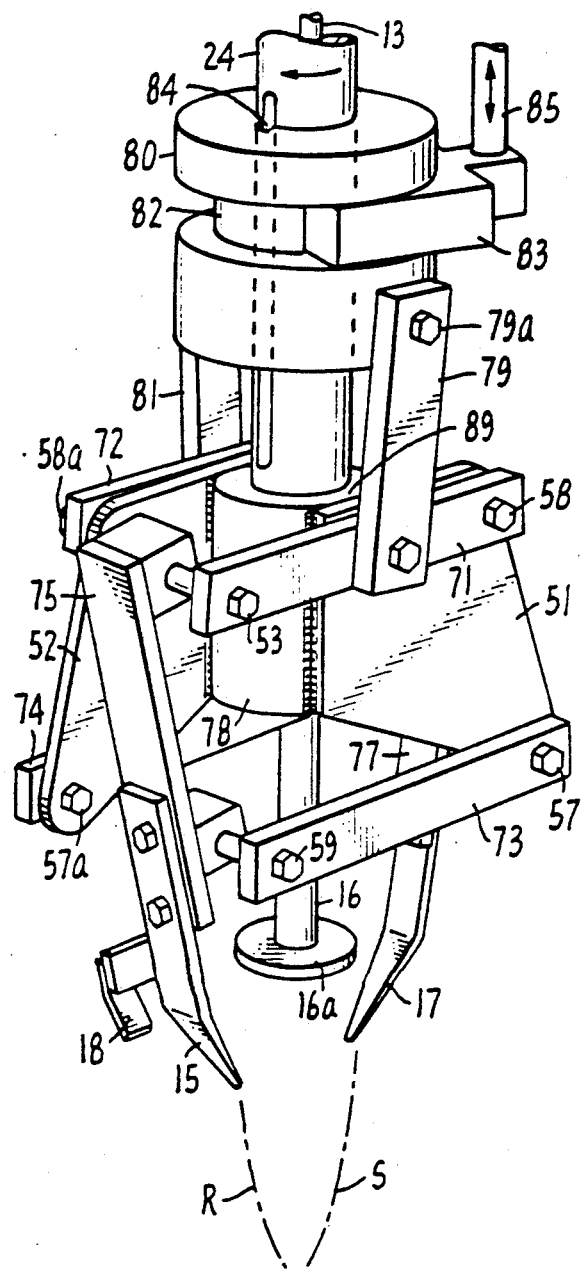
FIG. 10 is a perspective view of a preferred embodiment of a double-bladed coring knife assembly for use in the inventive apparatus.
Figure 11:
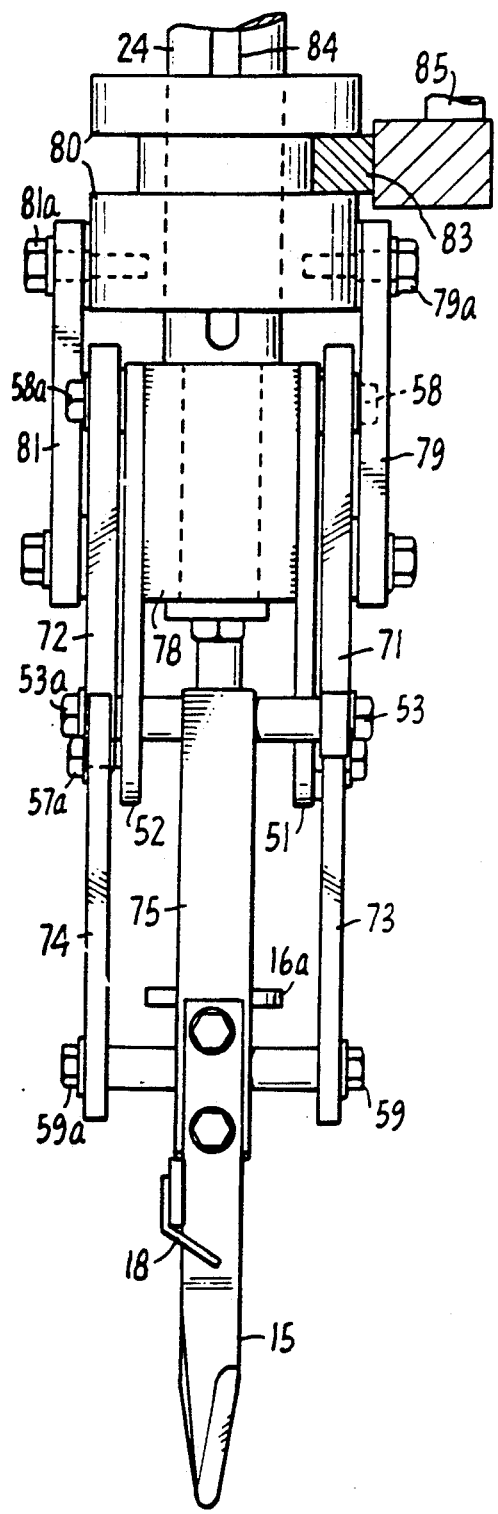
FIG. 11 is a side elevational view of a preferred embodiment of the double-bladed coring knife assembly shown in FIG. 10.
Figure 12:
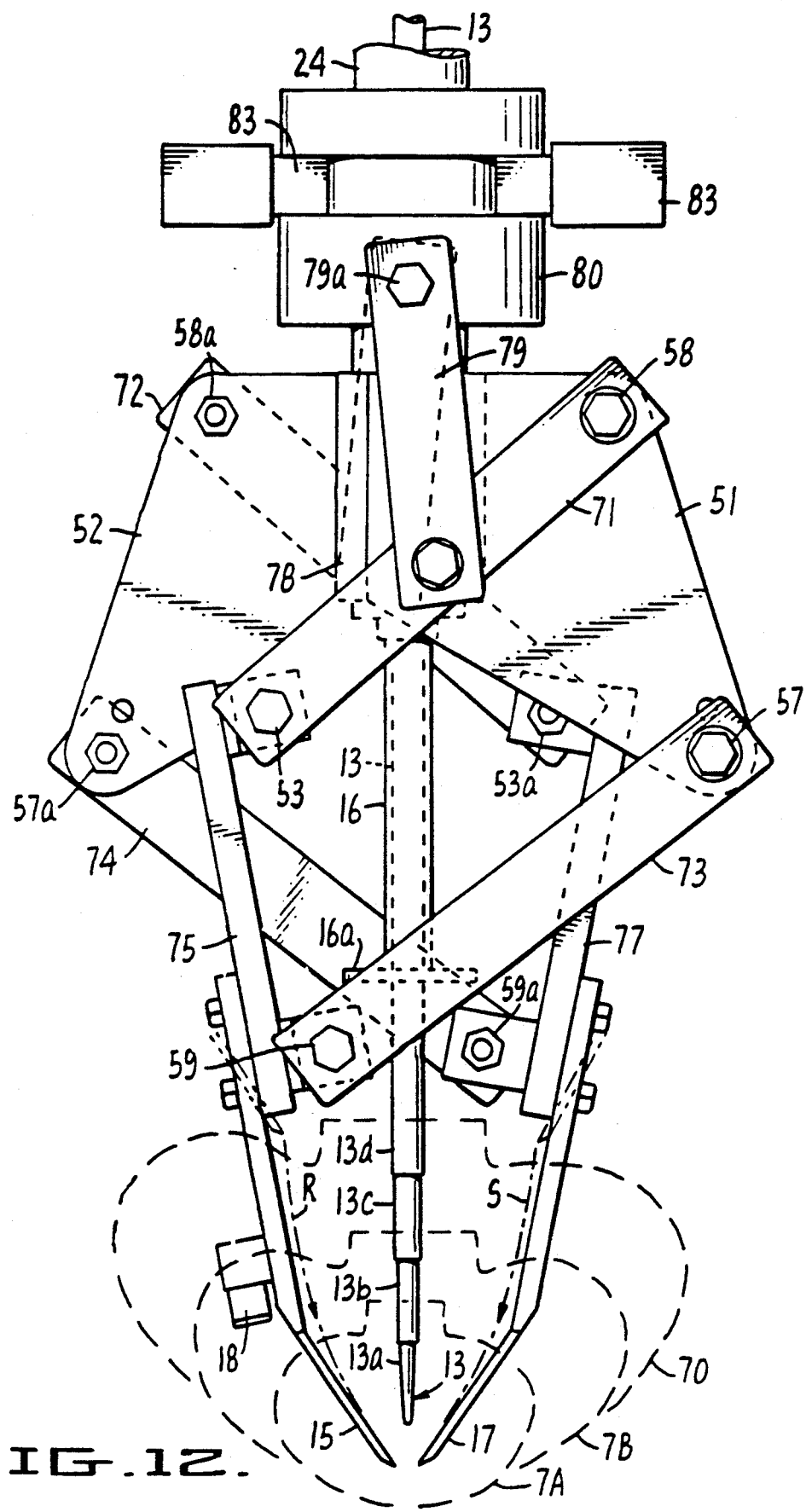
FIG. 12 is a side elevational view of the double-bladed coring knife assembly shown in FIG. 10, with the impaling member extended in a lowered position.
Figure 17:
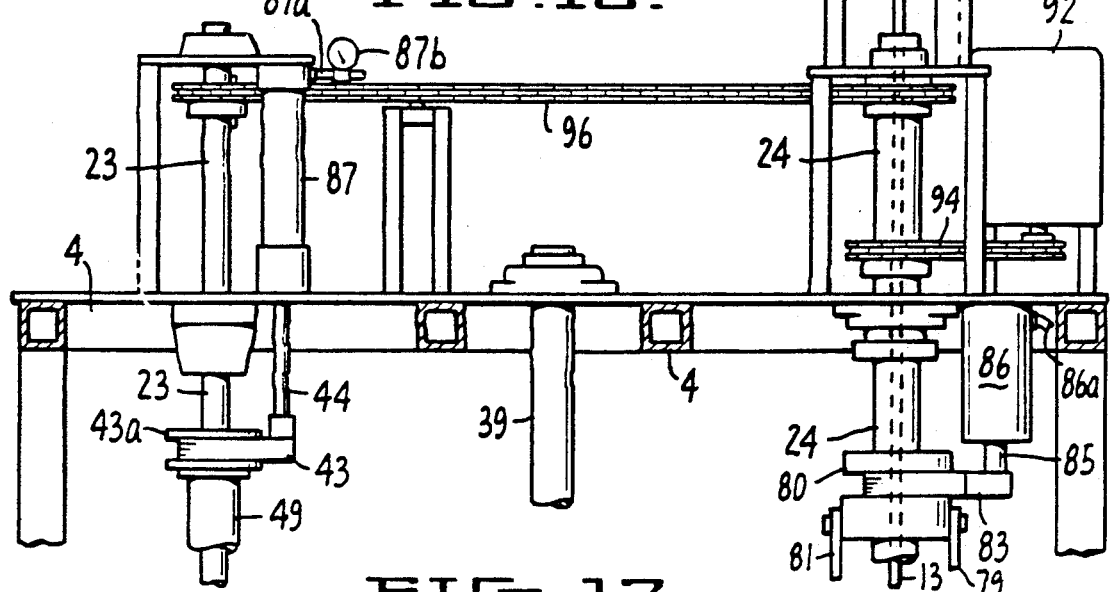
FIG. 17 is a partial cross-sectional view, in a vertical plane, of the upper portion of the embodiment of the inventive apparatus shown in FIG. 2.

Each of FIGS. 10, 11, and 12 is a perspective view of a preferred coring knife assembly for use in the inventive system. Coring knives 15 and 17 are pivotally attached to shaft 24, so that they are constrained to rotate as a unit with shaft 24 (and sliding jaw 80, arms 71, 73, and 79, members 51, 52, and 78, stripper tube 16, support 75, and support 77) but so that each is free to translate relative to shaft 24 along a generally helical path (preferably having decreasing radius with increasing distance downward along shaft 24's axis), on the surface of revolution defined by curves R and S. Shaft 24 is rotatably attached to frame 4 (as shown in FIG. 17), and is driven so as to rotate about its longitudinal axis.

Knives 15 and 17 are attached to knife holders 75 and 77, respectively. A pneumatic control means, including air cylinder 86, rod 85, and yoke 83, is provided for translating the rotating knife assembly comprising sliding jaw 80, arms 71, 73, and 79, knife holders 75 and 77, and knives 15 and 17 vertically relative to shaft 24, members .1, 52 and 78, stripper tube 16, and frame 4.

Yoke 83 fits within recessed portion 82 of jaw 80. As air cylinder 86 translates rod 85 downward, yoke 83 pushes jaw 80 downward relative to elongated key portion 84 of shaft 24 until air cylinder 86 reaches its downward limit of stroke. Since bracket 78 is fixed relative to shaft 24, bracket 78 would prevent further downward motion of jaw 80 and knives 15 and 17 relative to shaft 24, for example if air cylinder 86 should fail. Air cylinder 86 will subsequently raise shaft 85, so that yoke 83 will pull jaw 80 (and arms 79 and 81) upward.

When jaw 80 translates downward along key 84 and shaft 24, arms 79 and 81 will pivot about pins 79a and 81a, respectively, while pins 79a and 81a translate downward. As arms 79 and 81 move downward and pivot about pins 79a and 81a, arm 79 will force arm 71 (rotatably attached to arm 79 and members 51) along such a path that pin 53 will move radially outward (away from shaft 24). Arm 73 is rotatably attached to member 51 by pin 57 and is also rotatably attached to knife support 75 by pin 59, so that member 51 will pull arm 73 along such a path that pin 59 will move radially inward (toward shaft 24). Thus, as knife 15 (whose holder 75 is attached to pins 53 and 59) moves downward, pins 53 and 59 will cause the tip of knife 15 to move downward and radially inward, along a path which appears generally elliptical in the rotating frame of reference of rotating shaft 24. At the same time, arm 81 will force arm 72 (rotatably attached to arm 81 and member 52) along such a path that pin 53a will move radially outward (away from shaft 24). Arm 74 is rotatably attached to member 52 by pin 57a and is also rotatably attached to knife support 77 by pin 59a, which in turn, will pull arm 74 along such a path that pin 59a will move radially inward (toward shaft 24). Thus, as knife 17 (whose holder 77 is attached to pins 53a and 59a) moves downward, pins 53a and 59a will cause the tip of knife 17 to move downward and radially inward along a path which appears generally elliptical in the rotating frame reference of rotating shaft 24.

Thus, as knives 15 and 17 move generally downward through the article (i.e., cauliflower) being cored, the tips of knives 15 and 17 will each trace out a generally helical path on the elliptical surface of revolution defined by curves R and S shown in FIG. 10. Typically, knives 15 and 17 will rotate at a speed in the range from about 500 r.p.m. to about 600 r.p.m. as they core the article. As shown in FIG. 12, knives 15 and 17 will trace out the same helical path regardless of the size of the article being cored (i.e., large article 7C or small article 7A). However, the size of the one-piece core removed will automatically vary with the size of the article. Thus, a small core will be removed from small article 7A and a large core will be removed from large article 7C.

In a preferred embodiment, clearing paddle 18 is fixedly mounted near the lower end of one or both of knife supports 75 and 77. The function of paddle 18 is to clear any article fragments (i.e., cauliflower fleurettes) remaining in the product holder. Alternatively, a clearing paddle may be fixedly mounted near the path of rotating knives 15 and 17, on a component of the system that does not rotate as a unit with knives 15 and 17 (such as on the product holder).

In the embodiment of FIGS. 10-12, a stepped impaling pin 13 is disposed within stripper tube 16. Tube 16 is coaxially and fixedly mounted at the lower end of shaft 24. Pin 13 may be extended downward from tube 16 to penetrate the article being cored, in order to assist in holding the article fixed during the coring operation. A separate pneumatic control means (including air cylinder 88 shown in FIG. 17 to be discussed below) is provided for driving pin 13 downward from within tube 16 into engagement with the article (i.e., into engagement with the upward pointing stem of cauliflower 7), and for retracting pin 13 upward into tube 16 after completion of the coring operation. Stripper plate 16a is fixedly attached at the end of tube 16 for stripping the one-piece core from retracting pin 13 as pin 13 withdraws upward into tube 16. Pin 13 preferably comprises segments 13a, 13b, 13c, and 13d, listed in order of increasing diameter. In such preferred embodiment, pin 13's radial diameter increases stepwise with increasing distance along its axis away from its tip, so that pin 13 may be more easily withdrawn from the core impaled thereon, and so that pin 13 will apply sufficient downward force to hold the cauliflower against holding knives 5.

FIG. 14 is a cross-sectional view, in a horizontal plane, of the FIG. 2 apparatus with its product holders removed. Each of shafts 3 is capable of supporting a product holder of the type described with reference to FIGS. 4 through 7. Each of station dividers 28 includes a vertical portion 28a and an inclined portion 28b. Portions 28a separate the six processing stations of the inventive apparatus, and inclined portions 28b direct any product fragments generated during operation of the apparatus downward (preferably, into discharge chutes positioned below the horizontal plane of rotary table 8). At the coring station E, vertically oriented baffles 91 and 93 and vertically oriented barriers 92 are provided for confining the product fragments within the coring station (preferably, so that they will fall into the previously mentioned chutes). Barriers 91 and 93 are made of rubber, or other elastic material, so that they are capable of, temporarily deforming to admit divider portions 28a as portions 28a translate past the barriers.

Figure 15:
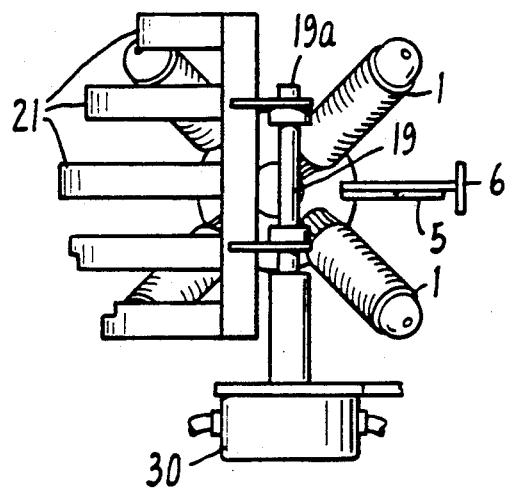
FIG. 15 is a top elevational view of a product holder of a preferred embodiment of the inventive apparatus, with a product ejection unit positioned adjacent thereto.
Figure 16:
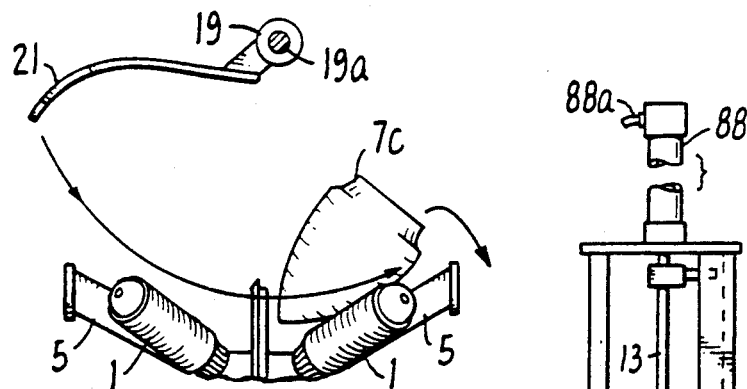
FIG. 16 is a side elevational view of the FIG. 15 apparatus.

FIG. 15 is a top elevational view of a product holder positioned at station F of the inventive apparatus, and a product ejection unit positioned adjacent thereto. The product holder comprises four rollers 1 and four holding knives 5 (although only one holding knife 5 is shown for simplicity). Ejector 21 of the product ejection unit includes cylindrical portion 19 which is mounted on ejector shaft 19a. Ejector drive unit 30 is coupled to shaft 19a for rotating ejector 21 as a unit with shaft 19a (in either rotational direction) when desired during the apparatus operating cycle. FIG. 16 is a side elevational view of the FIG. 15 apparatus.

After a coring operation has occurred at station E, one-piece product core 7c remains in the product holder. The product holder is then translated to station F. Core eject cam 65a will partially raise rollers 1 as the product holder translates to station F, to facilitate ejection of the core. Ejector drive 30 is actuated when the product holder is adjacent ejector 21, in order to rotate ejector 21 along the curved path shown in FIG. 16 to push core 7c out of the product holder. After ejector 21 returns to its starting position, the product holder will translate back to station A, where a new article may be loaded thereon.

FIG. 17 is a partial cross-sectional view, in a vertical plane, of the upper portion of the embodiment of the inventive apparatus shown in FIG. 2. Chain drive unit 92 is provided to chain 94, so that chain 94 will rotate coring knife shaft 24. As chain 94 rotates shaft 24 about its axis, shaft 24 will in turn drive chain 96 to cause chain 96 to rotate deleafing knife shaft 23.

Air cylinders 86, 87, and 88 are supplied with pressurized gas (preferably, the gas will be air) through gas lines 86a, 87a, and 88a, respectively. The pressure within cylinder 86 may be varied to cause a piston (not shown) within cylinder 86 to translate rod 85 (as a unit with jaw 80) upward (or first downward and then upward) relative to shaft 24.

Air cylinder 88, controllable independently from cylinder 86, is provided for translating impaling pin 13 downward and then upward relative to shaft 24 at desired moments during the apparatus operating cycle.

Air cylinder 87, controllable independently from air cylinders 86 and 88, is provided for translating rod 44 downward and then upward relative to shaft 23, so as to control the vertical position of deleafing knife 11 (discussed above with reference to FIGS. 8 and 9).

Figure 18:
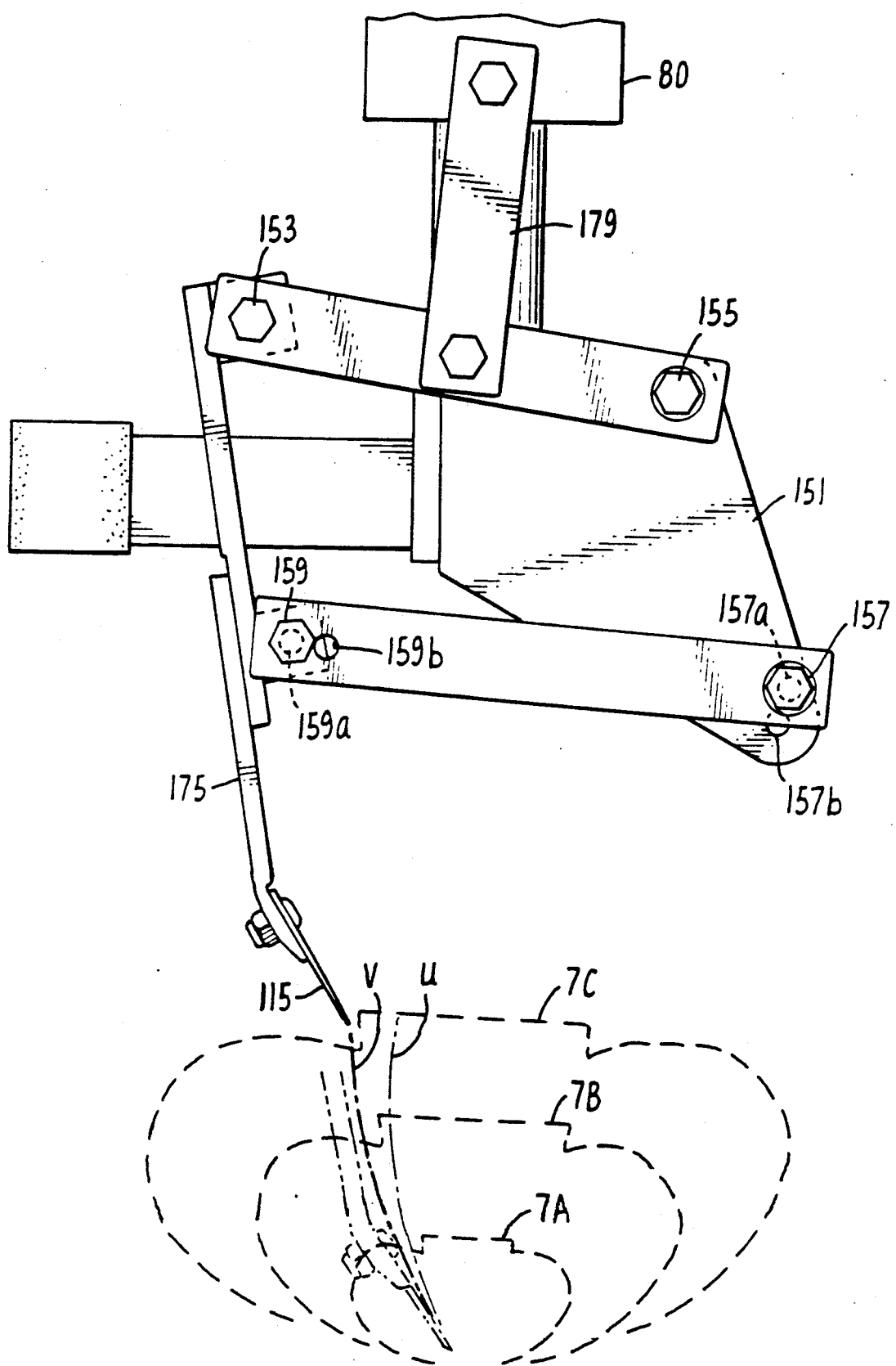
FIG. 18 is a side elevational view of a single blade coring knife assembly for use in an alternative embodiment of the inventive apparatus.

FIG. 18 is a side elevational view of a single blade coring knife assembly for use in an alternative embodiment the inventive apparatus. The FIG. 18 coring knife assembly is mounted at the lower end of jaw 80 in the same manner as is the double-bladed coring knife assembly of FIGS. 10-12. Members 179, 151, 153, 155, 157, 159, 175, and 115 correspond with members 79, 51, 53, 55, 57, 59, 75, and 15 of the double-bladed embodiment. Because jaw 80, and hence coring knife 115, will rotate about a vertical axis as they translate vertically, the tip of knife 115 will trace out a generally helical path as it slices through article 7C, 7B, or 7A just as will each of knives 15 and 17 in the double-bladed embodiment.

Both the single-bladed and double-bladed coring knife embodiments share the feature that the shape of the generally helical coring knife path may be varied by adjusting the positions of one or more of the pins (57, 57a, and 157) about which each knife support (77, 75, or 175) pivots. For example, by mounting pin 157 in hole 157*b* rather than in hole 157*a*, the path of knife 115 may be changed so that knife 115 follows surface U rather than surface V.

Figure 19:
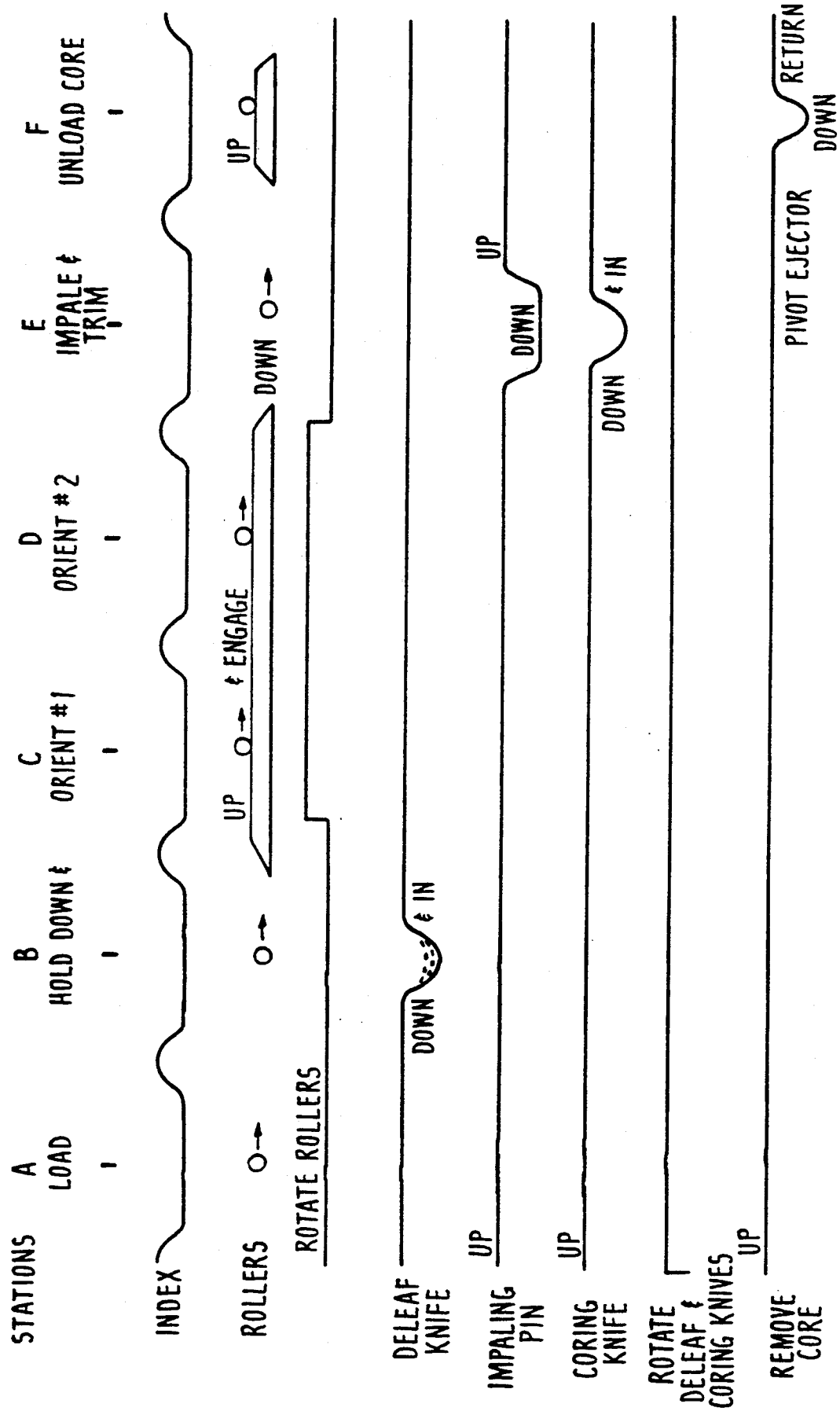
FIG. 19 is a set of graphs indicating the relative positions of the components of the FIG. 2 system, during an operating cycle of the system.

FIG. 19 is a set of graphs indicating the relative positions of various components of the FIG. 2 system, with respect to any given product holder, as the product holder translates around the inventive system during a single system operating cycle. Horizontal position along the FIG. 19 graphs represents the product holder's angular position about the axis of shaft 39.

The top graph, labeled "Index", indicates that Geneva drive mechanism 35 will maintain rotary table 8 (and each product holder mounted thereon) in a stationary position for a selected time period at each of stations A, B, C, D, E, and F. Mechanism 35 will rotate table 8 intermittently, to translate each product holder from station A to station B, and thereafter to stations C, D, E, and F in that order, and finally back to station A.

The graph labeled "Rollers" indicates that each cam follower 67 will raise the associated alignment rollers 1 into their raised position between stations B and C, and will maintain the rollers in their raised position until after the rollers translate past station D. Between stations D and E, cam follower 67 will roll along a downward sloping portion of track 65, thus allowing rollers 1 to fall into their lowered position. Between station E and F, rollers 1 will be partially raised (as cam follower 67 rolls upward along track 65*a*) so that rollers 1 support the core in the product holder at station F. Rollers 1 will then be lowered (after the product holder leaves station F and before it reaches station A).

The graph labeled "Rotate Rollers" indicates that belt 33 will engage gear 31 to rotate alignment rollers 1 of the product holder only during the period from just before the time the product holder reaches station C to just after the time the product holder leaves station D. During the remainder of the operating cycle, rollers 1 will not rotate.

The graph labeled "Deleaf Knife" indicates that the pneumatic control means including air cylinder 87, tube 44, sliding jaw 43*a*, and yoke 43 will maintain deleafing knife 11 in its raised position, until the product holder reaches station B. At station B, the pneumatic control unit will lower knife 11 into engagement with the article within the product holder. Because the lowest position of knife 11 (and the vertical distance through which knife 11 is lowered) depends on the control signal generated by pressure sensor 87*b* discussed above, FIG. 19 indicates that the lowest position of knife 11 is variable.

The graph labeled "Impaling Pin" indicates that the pneumatic control means including air cylinder 88 will lower impaling pin 13 into engagement with the article in the product holder only when the product holder is at station E. The graph labeled "Coring Knife" indicates that the pneumatic control means including air cylinder 86 will lower coring knives 15 and 17 into engagement with the article only while impaling pin 13 is engaged with the article. Thus, a one-piece core will be removed from the article at station E.

The graph labeled "Rotate Deleaf and Coring Knives" indicates that chains 94 and 96 will cause knives 11, 15 and 17 to rotate throughout the system's operating cycle.

The bottom graph, labeled "Remove Core", indicates that ejection unit 21 will pivot downward to remove a core from the product holder and subsequently return to its starting position when the product holder is at station F.

Figure 20:
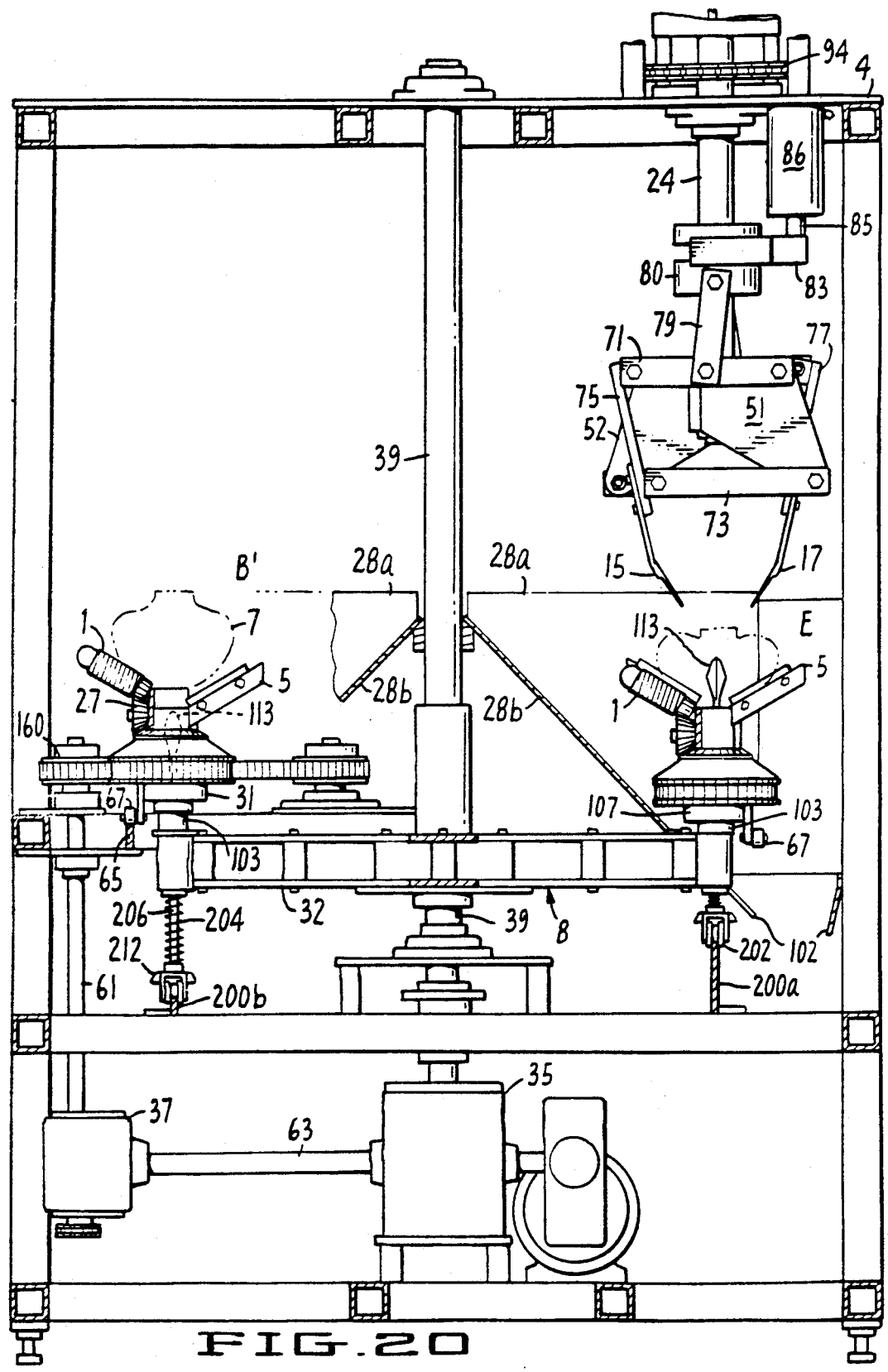
FIG. 20 is a cross-sectional view, in a vertical plane, of a variation on the apparatus shown in FIG. 2.

An alternative embodiment of the invention will next be described with reference to FIGS. 20 through 27. FIG. 20 is a cross-sectional view, in a vertical plane, of such alternative embodiment of the invention. The FIG. 20 system differs from the FIG. 2 system only in the following respects: the deleafing knife assembly including knife 11 is absent; downward-pointing impaling pin 13 is replaced by upward-pointing impaling knife 113 mounted in each product holder; a hold-down assembly including hold-down spring 115 (shown in FIG. 21) is included; and stations B, C, and D are replaced by stations B', C', and D' to be discussed below. All other components of the FIG. 20 system are identical to their counterparts in FIG. 2, and are numbered identically in FIGS. 2 and 20.

Impaling knife 113 is attached to knife support rod 206 within shaft 103. Each of arms 32, 34, 36, 38, 40, and 42 supports one of shafts 103. Impaling knife 113 and shaft 206 are supported by cam follower 202, as cam follower 202 rides on impaling knife cam track 200. Throughout most of the system's operating cycle (i.e., at stations A, B', C', and F), knife 113 is maintained in a retracted position. On the left side of FIG. 20, such a retracted knife (mounted within gear element 31) is shown in phantom view. However, at the impaling station (station D') and the coring station (station E), impaling knife 113 is held in a raised (extended) position. Such an extended impaling knife 113 is shown on the right side of FIG. 20.

Cam track 200 includes higher portions 200*a* and lower portions 200*b*. Higher portions 200*a* are located beneath impaling station D' and coring station E. As the each product holder is translated by table 8, the associated cam follower 202 rolls along cam track 200, upward as it approaches higher portions 200*a* and downward as it approaches lower portions 200*b*. At stations A, B', C', and F, spring 204 presses cam follower 202 downward against a lower portion 200*b*, thus pulling rod 206 and knife 113 into their lowered position. At stations D' and E, cam follower 202 urges rod 206 and knife 113 upward into their raised position (while also compressing spring 204) as cam follower 202 is supported by higher portion 200*a* of cam track 200.

Figures 21, 25:
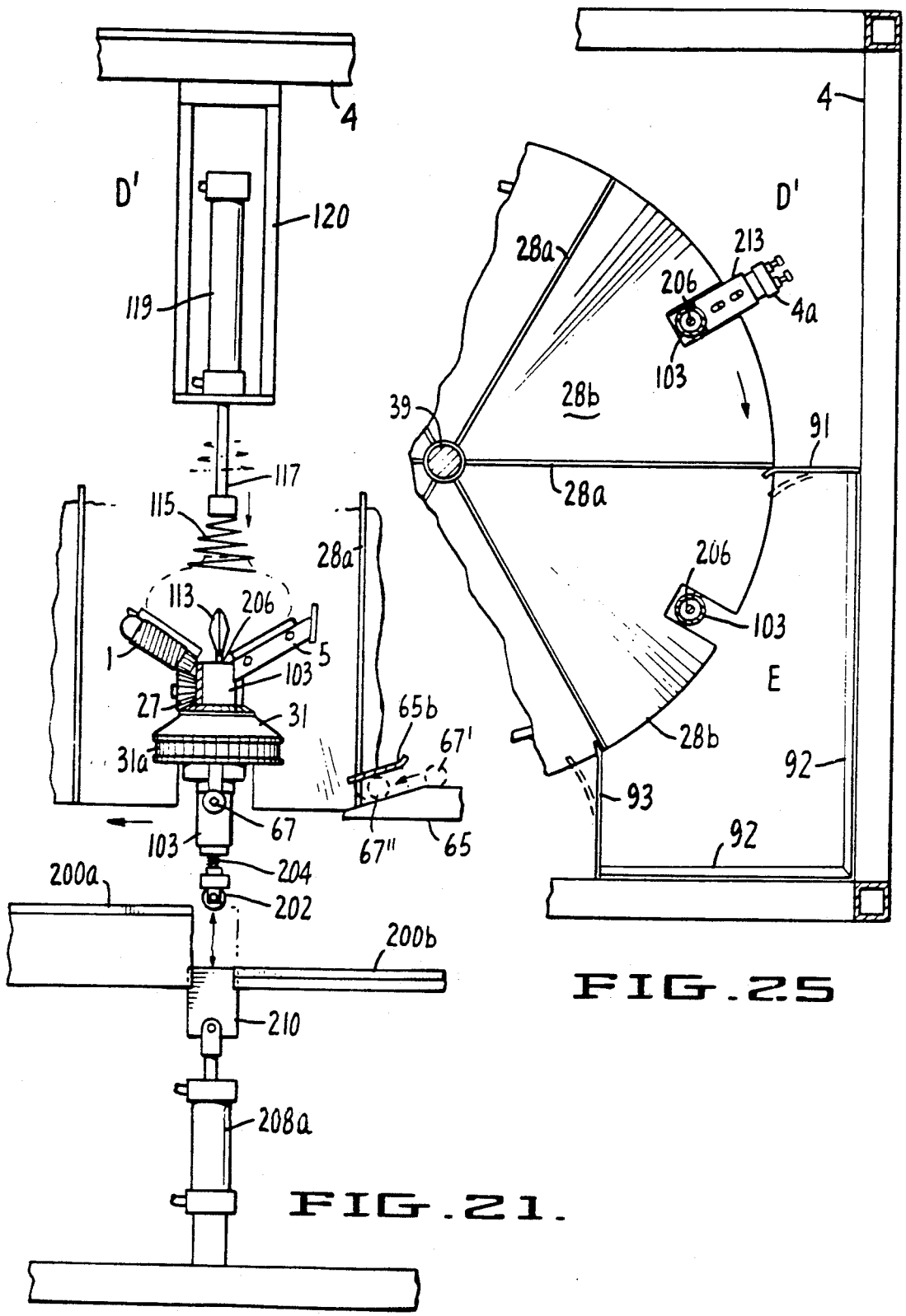
FIG. 21 is a side elevational view of a portion of the FIG. 20 apparatus.
FIG. 25 is a top elevational view of a portion of the FIG. 20 apparatus.

FIG. 21 shows impaling station D' of the FIG. 20 apparatus. Bracket 120, mounted on frame 4, supports air cylinder 119. Hold-down spring 115 and rigid shaft 117 are suspended from cylinder 119. Cylinder 119 may be actuated to push shaft 117 and spring 115 downward to press an article within the product holder therebelow against raised holding knives 5. While spring 115 holds the article down against knives 5, elevator 210 is raised by air cylinder 208*a* to lift cam follower 202 from lower cam track portion 200*b* to the level of higher cam track portion 200*a*. As elevator 210 rises, cam follower 202 urges rod 206 upward, and rod 206 in turn urges impaling knife 113 upward to impale the article being held down against holding knives 5. After knife 113 impales the article, cylinder 119 is again actuated to lift shaft 117 and spring 115 out of engagement with the article.

As in the embodiment of FIGS. 2 and 13, cam follower 67 follows cam track 55 to control the vertical position of the assembly comprising gear 31 and rollers 1. At station D' (shown in FIG. 21), cam follower 67 and rollers 1 have fallen into their lowered position so that holding knives 5 support the article being processed.

Figure 22:
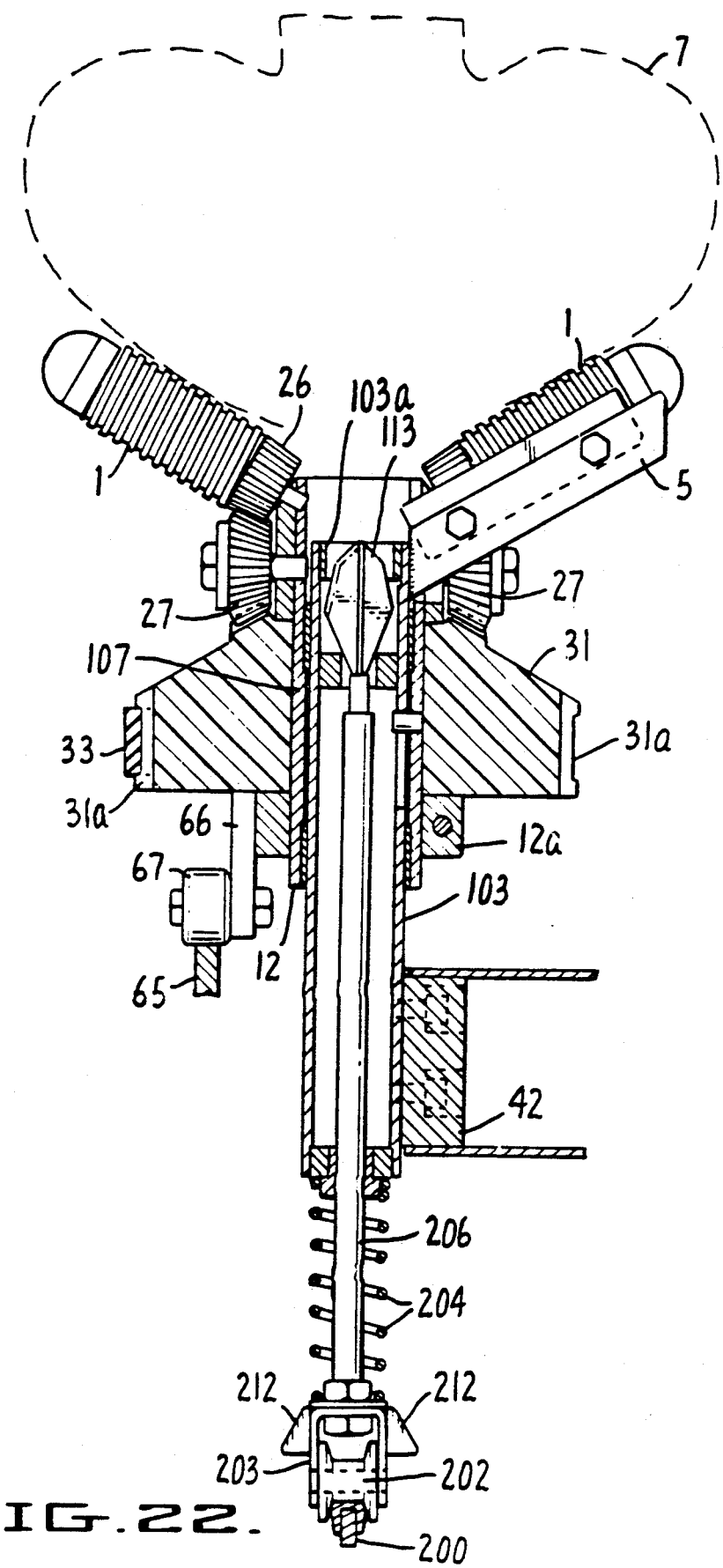
FIG. 22 is a cross-sectional view in a vertical plane, of a combined product holder and impaling knife assembly of the type employed in the FIG. 20 apparatus, with the impaling knife in a retracted position.

FIG. 22 shows, in greater detail, the combined product holder and impaling knife assembly of FIG. 20, with the impaling knife in a retracted position. Rod 206 is slidably mounted within shaft 103. Impaling knife 113 is mounted at the upper end of rod 206 and is aligned by insert 103a located at the upper end of shaft 103. Tube 12 and gear 31 are attached to shaft 103 in the same manner as the corresponding components of the FIG. 2 apparatus are attached to shaft 3. Spring 204 is positioned around rod 206 before bracket 203 is screwed onto rod 206's lower end. Cam follower 202 is rotatably mounted on bracket 203. Rigid wedge members 212 are fixedly mounted on bracket 203.

FIG. 23 shows the combined product holder and impaling knife assembly of FIG. 22 at impaling station D'. The product holder and impaling knife assembly is shown at an instant just after elevator 210 (not shown in FIG. 23) has lifted the combined product holder and impaling knife assembly into engagement with the locking assembly comprising spring-loaded members 211 and members 213 (at the horizontal level of track portion 200a), but just before the product holder and impaling knife assembly has become engaged with track portion 200a. Track portion 200a is positioned below the plane of FIG. 23 (in other words, into the page with respect to FIG. 23). As the product holder and impaling knife assembly continues to translate (horizontally) into the plane of FIG. 23, the locking assembly will guide cam follower 202 into engagement with track portion 200a.

Elevator 210 is attached to air cylinder 208a in the manner shown in FIG. 21. The locking assembly comprising spring-loaded members 211 and members 213 is rigidly attached to frame 4 at the horizontal level of track portion 200a near the upper end of elevator 210's path. FIG. 23 represents the configuration at station D' immediately after cylinder 208a has lifted elevator 210 (and cam follower 202 riding on elevator 210) upward to the level of track portion 200a. As cylinder 208a raised cam follower 202 and elevator 210 vertically from the level of track portion 200b, spring-loaded locking members 211 were displaced outward by wedge members 212 as members 212 moved up past members 211, and members 211 were then urged back into their inward, locked, position (shown in FIG. 23) by springs 208, so as to position cam follower 202 at the same level as cam 200a. Upper surfaces 212a of wedge members 212 then engaged with locking members 213, preventing further upward motion of elevator 210 relative to cam follower 202 and rod 206.

FIG. 23 thus shows locking members 211, 212, and 213 in their locked configuration, with impaling knife 113 inserted in article 7. While Geneva mechanism 35 retains the product holder at the impaling station D', members 211, 212, and 213 remain in such locked position. When Geneva mechanism 35 resumes horizontal translation of the combined impaling knife and product holder assembly, but while members 211 and 213 remain in their locked position, rotary table 8 will translate shaft 103 (and the rest of the combined impaling knife and product holder assembly) horizontally relative to elevator 210 and the locking mechanism. Thus, while members 211 and 213 remain in the locked position (after elevator 210 had lifted impaling knife 113 upward so that cam follower 202 is level with track portion 200a), arm 42 of table 8 translates the impaling knife and product holder assembly toward the left (as shown in FIG. 21) from locking member 211 toward track portion 200a, so that the impaling knife and product holder assembly will slide horizontally from locking member 211 onto the track portion 200a.

FIG. 24 is a cross-sectional view of the FIG. 23 assembly, in the horizontal plane defined by line 24—24 of FIG. 23. Wedge members 212 rest on spring-loaded locking members 211 at station D'. Cam follower 202 is attached between members 212. Springs 208 are mounted around pins, which fixedly attach locking members 211 to portions 4a of frame 4. Springs 208 urge members 211 inward, toward cam follower 202. Each member 211 has two slots 221. A pin 220 is mounted within each slot 221, so that each member 211 is free to translate horizontally relative to each pin 220. As shown in FIG. 24, members 211 are in their extreme inward position, in which each pin 220 abuts the outer end of its slot 221 and pins 220 thus restrain members 211 from further translation toward cam follower 202.

To reach the locked position shown in FIG. 24, the upper inclined surface 212a of each wedge 212 moved upward from a position below the corresponding inclined surface 211a (shown in FIG. 23) of member 211. During such upward motion of wedges 212, the wedges 212 overcame the inward spring force exerted by springs 208 in order to force members 211a temporarily outward (away from cam follower 202).

FIG. 25 is a cross-sectional view, in a horizontal plane, of a portion of the FIG. 20 apparatus with its product holders removed. Each of shafts 103 is capable of supporting one of the product holder. Each of station dividers 28 includes a vertical portion 28a and an inclined portion 28b. Portions 28a separate the six processing stations of the inventive apparatus, and inclined portions 28b direct any product fragments generated during operation of the apparatus downward (preferably, into chutes positioned below the horizontal plane of rotary table 8). At impaling station D', elevator 210 (which includes member 213) is mounted on frame portion 4a (a portion of frame 4) at a position below shaft 103. At coring station E, vertically oriented baffles 91 and 93 and vertically oriented barriers 92 are provided for confining the product fragments within the coring station.

Figure 26:
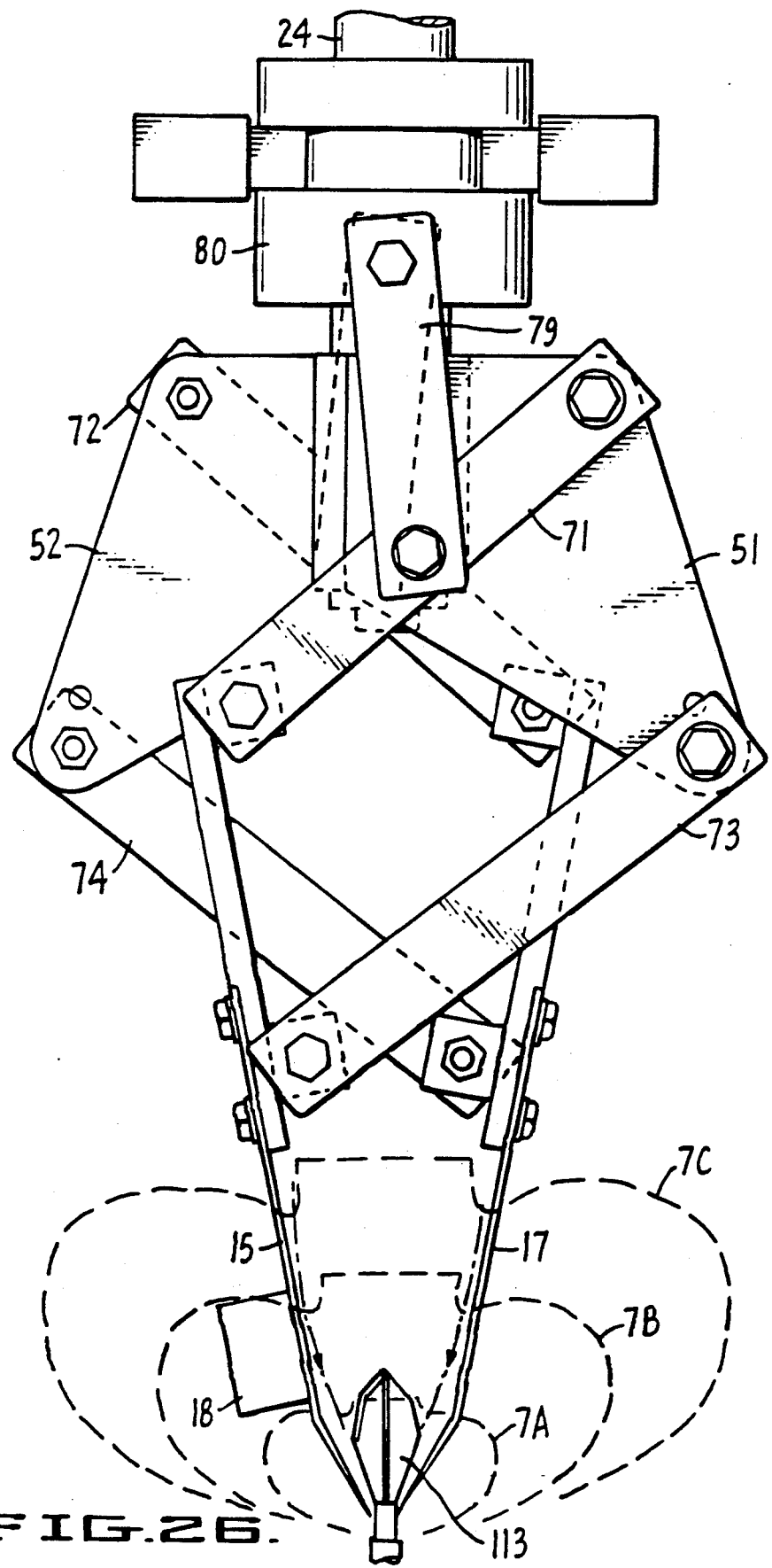
FIG. 26 is a side elevational view of the coring knife assembly of the FIG. 20 apparatus.

FIG. 26 is a side elevational view of station E of the FIG. 20 apparatus, showing the coring knife assembly and the extended impaling knife 113. The FIG. 26 coring knife assembly is identical to that of the FIG. 2 embodiment, except that stripper tube 16 and downward oriented impaling pin 13 are absent from the FIG. 26 assembly. In the FIG. 26 embodiment, the article to be cored (i.e., a cauliflower such as cauliflower 7A, 7B, or 7C) is not impaled from above by pin 13, but is instead impaled from below by knife 113 at the impaling station D'. Coring knives 15 and 17 are preferably mounted in such a position that they never strike impaling knife 113 as they move along their helical paths.

Core ejection at station F is preferably accomplished by the same mechanism as is shown in FIGS. 15 and 16.

Figure 27:
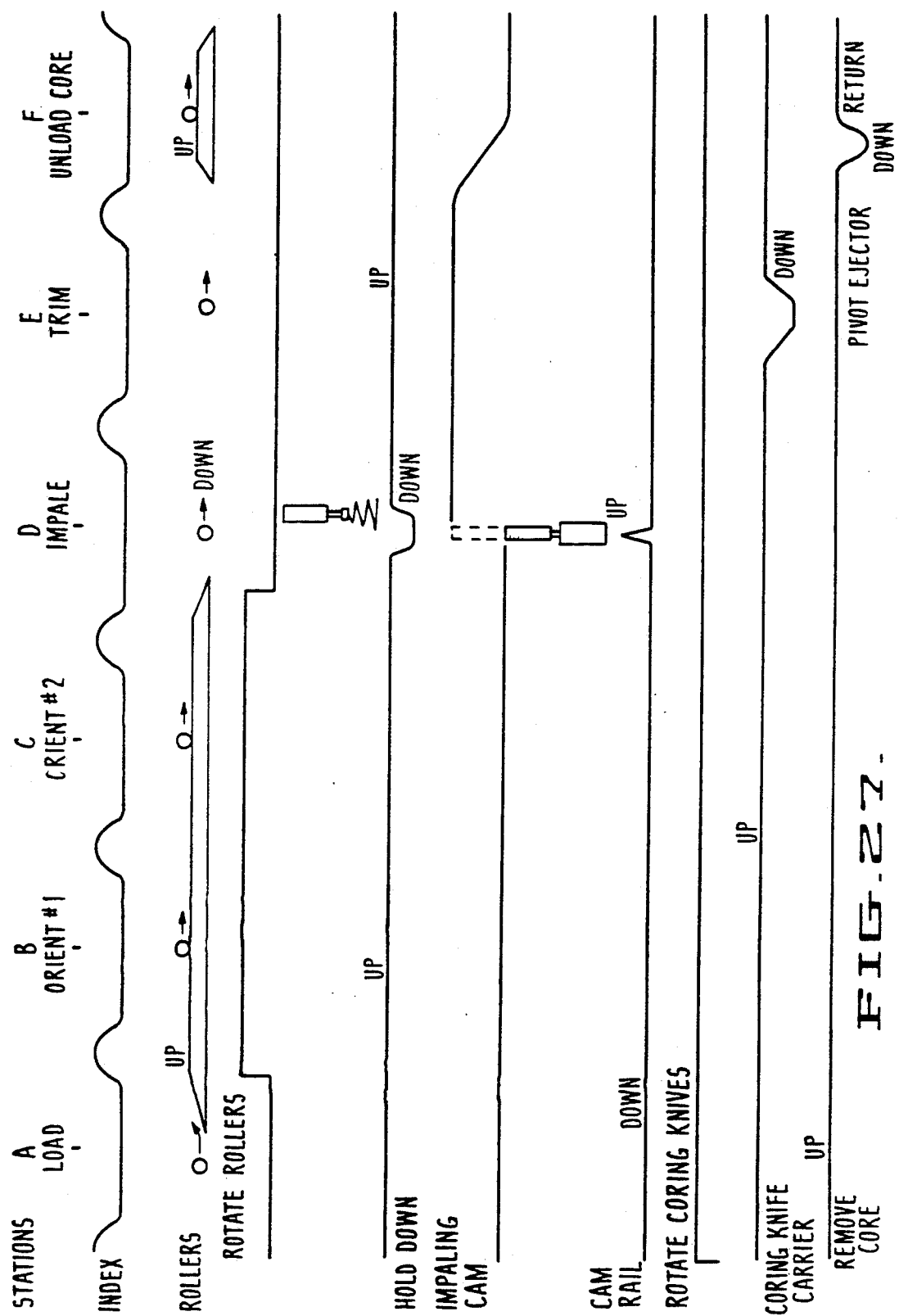
FIG. 27 is a set of graphs indicating the relative positions of the components of the FIG. 20 system, during an operating cycle of the system.

FIG. 27 is a set of graphs indicating the relative positions of various components of the FIG. 20 system, with respect to and given product holder, as the product holder translates around the FIG. 20 system during a single system operating cycle. As in the FIG. 19 graphs, horizontal position along the FIG. 27 graphs represents the product holder's angular position about the axis of shaft 39. An alternative embodiment of the method of the invention may thus be conveniently described with reference to FIG. 27.

The top graph, labeled "Index", indicates that Geneva drive mechanism 35 will maintain rotary table 8 (and each product holder mounted thereon) in a stationary position for a selected time period at each of stations A, B', C', D', E, and F. Mechanism 35 will rotate table 8 intermittently, to translate each product holder from station A to station B', and thereafter to stations C', D', E, and F in that order, and finally back to station A.

The graph labeled "Rollers" indicates that each cam follower 67 will raise the associated alignment rollers 1 into their raised position between stations A and B', and will maintain the rollers in their raised position until after the rollers translate past station C'. Between stations C' and D', cam follower 67 will roll along a downward sloping portion of track 65, thus allowing rollers 1 to fall into their lowered position. This graph also indicates that at station F, cam followers 67 will raise rollers 1 (either partially, or all the way) up to the level they occupy at stations A and B', as cam followers 67 roll along cam track portion 65a.

The graph labeled "Rotate Rollers" indicates that belt 33 will engage gear 31 to rotate alignment rollers 1 of the product holder only during the period from just before the time the product holder reaches station B' to just after the time the product holder leaves station C'. During the remainder of the operating cycle, rollers 1 will not rotate.

The graph labeled "Hold Down" indicates that the pneumatic control means including air cylinder 119 and rod 117 will maintain hold-down spring 115 in its raised position, until the product holder reaches impaling station D'. At station D', the pneumatic control means will lower spring 115 into engagement with the article within the product holder. While spring 115 holds the article down against holding knives 5, impaling knife cam follower 202, raised by elevator 210 will cause impaling knife 113 to translate upward to impale the article.

As shown in the graph labeled "Impaling Cam", impaling knife cam track 200 will maintain impaling knife 113 in its extended position until after the product holder has passed station E. Between stations E and F, cam track 200 will dip downward, to allow cam follower 202 and knife 113 to fall into their lowered, retracted position and to strip the one-piece core 7c from impaling knife 113.

The graph labeled "Cam Rail" indicates that air cylinder 208 will raise elevator 210 only while the product holder is at station D', and hold-down spring 115 is pressing the article downward against the product holder's holding knives 5.

The graph labeled "Rotate Coring Knives" indicates that chain 94 will cause coring knives 15 and 17 to rotate throughout the system's operating cycle.

The bottom graph, labeled "Coring Knife Carrier", indicates that coring knives 15 and 17 will be lowered into engagement with an article only when the product holder containing the article is at coring station E (also referred to as "trim" station E). A one-piece core will thus be removed from the article at station E.

After station E, rotary table 8 will translate the product holder to unloading station F, where the one-piece core may be removed from the product holder with the same mechanism shown in FIGS. 15 and 16.

The foregoing is merely illustrative and explanatory of the inventive method and apparatus. Various changes in the component sizes and shapes, and other details of the embodiments described herein may be within the scope of the appended claims.

What is claimed is:

1. A coring apparatus, including:
   (a) a conveyor unit;
   (b) a first holder mounted on the conveyor unit;
   (c) a drive mechanism coupled to the conveyor unit for sequentially translating the conveyor unit and the first holder through a set of stations, including a coring station, along a process path;
   (d) a rotatable coring knife assembly positioned at the coring station, and including a pivot arm assembly and a first coring knife mounted on the pivot arm assembly; and
   (e) a means for rotating the coring knife assembly while pivoting the pivot arm assembly, to translate the first coring knife downward along a coring path, wherein the first coring knife is capable of severing a one-piece core from an article resting in the first holder at the coring station, as the first coring knife translates along the coring path, wherein the first holder includes:
   a first shaft attached to the conveyor unit;
   a second shaft slidably mounted on the first shaft; and
   a set of alignment rollers rotatably mounted on the second shaft.

2. The apparatus of claim 1, also including:
   (g) cam means coupled to the second shaft for translating the second shaft and the set of alignment rollers, as a unit, between a raised position and a lowered position relative to the first shaft; and
   (h) means coupled to the first holder for rotating the alignment rollers relative to the second shaft.

3. The apparatus of claim 2, wherein each alignment roller has a threaded surface, and wherein, as the alignment rollers rotate relative to the second shaft; the alignment rollers' threaded surfaces are capable of rotating an article in the first holder into a desired alignment.

4. The apparatus of claim 3, wherein element (h) rotates the alignment rollers to align the article at an alignment along the process path, and wherein the first holder translates through the alignment station before reaching the coring station.

5. The apparatus of claim 2, also including a set of holding knives fixedly attached to the first shaft.

6. A coring apparatus, including:
   (a) a conveyor unit;
   (b) a first holder mounted on the conveyor unit;
   (c) a drive mechanism coupled to the conveyor unit for sequentially translating the conveyor unit and the first holder through a set of stations, including a coring station, along a process path;
   (d) a rotatable coring knife assembly positioned at the coring station, and including a pivot arm assembly and a first coring knife mounted on the pivot arm assembly; and
   (e) a means for rotating the coring knife assembly while pivoting the pivot arm assembly, to translate the first coring knife downward along a coring path, wherein the first coring knife is capable of severing a one-piece core from an article resting in the first holder at the coring station, as the first coring knife translates along the coring path, wherein element (c) translates the conveyor unit and the first holder initially into a loading station, then from the loading station into a deleafing station, then into a first alignment station, then into a second alignment station, then into the coring station, and then into a core unloading station.

7. A coring apparatus, including:
(a) a conveyor unit;
(b) a first holder mounted on the conveyor unit;
(c) a drive mechanism coupled to the conveyor unit for sequentially translating the conveyor unit and the first holder through a set of stations, including a coring station, along a process path;
(d) a rotatable coring knife assembly positioned at the coring station, and including a pivot arm assembly and a first coring knife mounted on the pivot arm assembly; and
(e) a means for rotating the coring knife assembly while pivoting the pivot arm assembly, to translate the first coring knife downward along a coring path, wherein the first coring knife is capable of severing a one-piece core from an article resting in the first holder at the coring station, as the first coring knife translates along the coring path, wherein the set of stations includes a deleafing station, and also including:
a frame positioned adjacent the process path, said coring knife assembly being rotatably mounted on the frame; and
a deleafing knife assembly rotatably mounted on the frame adjacent the deleafing station.

8. The apparatus of claim 7, wherein the deleafing knife assembly includes a deleafing knife, and also including:
(i) a means, coupled to the deleafing knife assembly, for simultaneously rotating and lowering the deleafing knife, in order to direct the deleafing knife downward along a generally helical deleafing path.

9. The apparatus of claim 8, wherein the radius of the deleafing path decreases as the deleafing knife translates downward relative to the first tube.

10. The apparatus of claim 7, wherein the deleafing knife assembly includes:
(j) a first tube having a substantially vertical longitudinal axis;
(k) a wedge member fixedly attached to the first tube;
(l) a second tube coaxially mounted around the first tube, the second tube being free to slide parallel to the first tube's longitudinal axis but being constrained to rotate as a unit with the first tube about the first tube's longitudinal axis, said second tube having an upper end and a lower end;
(m) a knife support having a lower end portion attached to the deleafing knife, a middle portion pivotally attached to the second tube's lower end, and an upper end portion slidably engaged with the wedge member; and
(n) a means for translating the second tube and the knife support, as a unit, downward relative to the first tube and the wedge member while the first tube, the second tube, the wedge member, and the knife support rotate as a unit.

11. The assembly of claim 8, wherein element (i) is capable of operating in a lifting mode in which it simultaneously rotates and raises the deleafing knife, so as to direct the deleafing knife along a generally helical upward path, and also including:
(o) a pressure sensor connected to element (i), for supplying a control signal to element (i) to cause element (i) to operate in its lifting mode.

12. A coring apparatus, including:
(a) a frame;
(b) a rotary table;
(c) a first holder mounted on the rotary table, and dimensioned to support a first article;
(d) a Geneva drive mechanism coupled to the table for driving the table and the first holder, as a unit, along a process path through a set of stations including a coring station;
(e) a first shaft, having a substantially vertical longitudinal axis, said first shaft being mounted on the frame above the coring station;
(f) means for rotating the first shaft about its longitudinal axis relative to the frame;
(g) a pivoting arm assembly attached to the first shaft in a manner so that the pivoting arm assembly is free to translate parallel to the first shaft's longitudinal axis but is constrained to rotate as a unit with the first shaft;
(h) a first coring knife fixedly attached to the pivoting arm assembly; and
(i) a means for translating the pivoting arm assembly downward relative to the first shaft's longitudinal axis while the first shaft rotates as a unit with the pivoting arm assembly, so as to translate the first coring knife downward along a generally helical first coring path, so that the first coring knife is capable of severing fragments of the first article from a one-piece core of the first article in the first holder when the first holder is positioned at the coring station, wherein the pivoting arm assembly pivots as it translates downward, so as to direct the first coring knife inward toward the first shaft's axis, as the first knife translates downward, so that the radius of said first coring path decreases as the first coring knife translates downward, and wherein the pivoting arm assembly includes:
a jaw, slidably mounted around the first shaft and coupled to element (i);
a knife support, including a lower end to which the first coring knife is attached, and an upper end;
a first arm, pivotally attached between the jaw and the knife support's upper end; and
a second arm, pivotally attached between the jaw and the knife support's lower end.

13. The apparatus of claim 12, wherein the knife support's lower end is attached to the second arm at an adjustable pivot point, so that the first coring path may be varied by adjusting the pivot point.

14. A coring apparatus, including:
(a) a frame;
(b) a rotary table;
(c) a first holder mounted on the rotary table, and dimensioned to support a first article;
(d) a Geneva drive mechanism coupled to the table for driving the table and the first holder, as a unit, along a process path through a set of stations including a coring station;
(e) a first shaft, having a substantially vertical longitudinal axis, said first shaft being mounted on the frame above the coring station;
(f) means for rotating the first shaft about its longitudinal axis relative to the frame;
(g) a pivoting arm assembly attached to the first shaft in a manner so that the pivoting arm assembly is free to translate parallel to the first shaft's longitudinal axis but is constrained to rotate as a unit with the first shaft;
(h) a first coring knife fixedly attached to the pivoting arm assembly; and (i) a means for translating the pivoting arm assembly downward relative to the first shaft's longitudinal axis while the first shaft rotates as a unit with the pivoting arm assembly, so as to translate the first coring knife downward along a generally helical first coring path, so that the first coring knife is capable of severing fragments of the first article from a one-piece core of the first article in the first holder when the first holder is positioned at the coring station, also including a second coring knife fixedly attached to the pivoting arm assembly, and wherein element (i) is capable of translating the pivoting arm assembly downward relative to the first shaft's longitudinal axis while the first shaft rotates as a unit with the pivoting arm assembly, so as to translate the first coring knife downward along a generally helical first coring path and to translate the second coring knife downward along a generally helical second coring path, so that the first and the second coring knives are capable of simultaneously engaging the first article in the first holder to sever fragments of the first article from a one-piece core of the first article.

15. A coring apparatus, including:
(a) a frame;
(b) a rotary table;
(c) a first holder mounted on the rotary table, and dimensioned to support a first article;
(d) a Geneva drive mechanism coupled to the table for driving the table and the first holder, as a unit, along a process path through a set of stations including a coring station;
(e) a first shaft, having a substantially vertical longitudinal axis, said first shaft being mounted on the frame above the coring station;
(f) means for rotating the first shaft about its longitudinal axis relative to the frame;
(g) a pivoting arm assembly attached to the first shaft in a manner so that the pivoting arm assembly is free to translate parallel to the first shaft's longitudinal axis but is constrained to rotate as a unit with the first shaft;
(h) a first coring knife fixedly attached to the pivoting arm assembly; and
(i) a means for translating the pivoting arm assembly downward relative to the first shaft's longitudinal axis while the first shaft rotates as a unit with the pivoting arm assembly, so as to translate the first coring knife downward along a generally helical first coring path, so that the first coring knife is capable of severing fragments of the first article from a one-piece core of the first article in the first holder when the first holder is positioned at the coring station, also including:
(j) an impaling pin mounted on the frame above the coring station; and
(k) means for translating the impaling pin downward before element (i) translates the first coring knife downward, so that the impaling pin is capable of impaling the core of the first article in the first holder, when the first holder is positioned at the coring station but before the fragments are severed from the core of the first article.

16. The apparatus of claim 15, wherein element (k) is also capable of translating the impaling pin upward after the core is severed from the first article.

17. The apparatus of claim 16, also including:
an impaling pin attached to the pivoting arm assembly, so that the impaling pins extends through the impaling pin tube and is capable of translating substantially vertically relative to the impaling pin tube; and
a stripper member attached to the impaling pin tube in a position so as to be capable of stripping the core from the impaling pin as element (k) translates the impaling pin upward through the impaling pin tube.

18. The apparatus of claim 17, also including:
(l) an ejector mounted along the process path above the unloading station; and
(m) means for pivoting the ejector past the first holder, when the first holder is at the unloading station, so that the ejector is capable of ejecting the core from the first holder.

19. A coring apparatus, including:
(a) a frame;
(b) a rotary table;
(c) a first holder mounted on the rotary table, and dimensioned to support a first article;
(d) a Geneva drive mechanism coupled to the table for driving the table and the first holder, as a unit, along a process path through a set of stations including a coring station;
(e) a first shaft, having a substantially vertical longitudinal axis, said first shaft being mounted on the frame above the coring station;
(f) means for rotating the first shaft about its longitudinal axis relative to the frame;
(g) a pivoting arm assembly attached to the first shaft in a manner so that the pivoting arm assembly is free to translate parallel to the first shaft's longitudinal axis but is constrained to rotate as a unit with the first shaft;
(h) a first coring knife fixedly attached to the pivoting arm assembly; and
(i) a means for translating the pivoting arm assembly downward relative to the first shaft's longitudinal axis while the first shaft rotates as a unit with the pivoting arm assembly, so s to translate the first coring knife downward along a generally helical first coring path, so that the first coring knife is capable of severing fragments of the first article from a one-piece core of the first article in the first holder when the first holder is positioned at the coring station, wherein element (d) translates the table and the first holder initially into a loading station, then from the loading station into a first alignment station, then into a second alignment station, then into an impaling station, then into the coring station, and then into a core unloading station.

20. The apparatus of claim 19, also including:
(n) an impaling knife slidably attached to the first holder so that said impaling knife has a substantially vertical axis; and
(o) a means for translating the impaling knife upward parallel to said impaling knife's axis, to impale the core of the first article in the first holder when the first holder is positioned at the impaling station.

21. The apparatus of claim 20, wherein element (o) includes:
(p) a cam track positioned along the process path, and including a higher portion at the impaling station and a lower portion at the impaling station;

(q) a cam follower extending between the impaling knife and the cam track; and (r) an elevator for raising the cam follower from a retracted position in which the cam follower is engaged with the lower portion of the cam track, to an extended position in which the cam follower engages the higher portion of the cam track.

22. The apparatus of claim 21, also including a pair of spring-loaded locking members attached to the frame for engagement with the cam follower when the elevator is in the extended position, wherein the pair of spring-loaded locking members is capable of guiding the cam follower into engagement with the higher portion of the cam track.

23. The apparatus of claim 20, also including:

(s) a hold-down spring mounted on the frame above the impaling station; and (t) a means for translating the hold-down spring downward into an extended position in which the hold-down spring is capable of exerting a downward force on the first article in the first holder.

24. The apparatus of claim 23, wherein element (t) translate the hold-down spring downward into its extended position at the same time as element (o) translates the impaling knife upward to impale the core of the first article in the first holder, so that the hold-down spring exerts a downward force restraining upward motion of the first article during the impaling operation.

25. A coring apparatus, including:

(a) a frame;

(b) a rotary table;

(c) a set of holder mounted around the periphery of the rotary table, where each holder in the set is dimensioned to support an article to be cored;

(d) a drive mechanism coupled to the table for sequentially translating the table and the holders as a unit through a set of stations, including a coring station, along a closed process path;

(e) a rotatable coring knife assembly mounted on the frame in a position above the coring station, and including a pivot arm assembly and a first coring knife mounted on the pivot arm assembly;

(f) a means for rotating the coring knife assembly while pivoting the pivot arm assembly, to translate the first coring knife downward along a coring path each time one of the holders is positioned at the coring station, wherein the first coring knife is capable of severing fragments of each article from a one-piece core of said each article resting in each said one of the holders as the first coring knife translates along the coring path;

(g) an impaling pin mounted on the frame in a position above the coring station; and (h) means for translating the impaling pin downward before element (f) translates the first coring knife downward, so that the impaling pin is capable of impaling the core of each article resting in each one of the holders, when said each one of the holders is positioned at the coring station but before the core is severed from said article fragments.

26. The apparatus of claim 25, wherein each holder includes:

a first shaft attached to the rotary table;

a second shaft slidably mounted on the first shaft;

a set of alignment rollers rotatably mounted on the second shaft, each said roller having a threaded surface;

a cam means coupled to the second shaft for translating the second shaft and the set of alignment rollers, as a unit, between a raised position and a lowered position relative to the first shaft; and means coupled to the first holder for rotating the alignment rollers relative to the second shaft, so that as the alignment rollers rotate relative to the second shaft, the alignment rollers' threaded surfaces are capable of rotating an article in the holder into a desired alignment.

27. The apparatus of claim 26, wherein element (d) translates the table so as to translate each holder sequentially into a loading station, then into at least one alignment station, then into the coring station, and then into an unloading station.

28. The apparatus of claim 27, wherein element (d) translates the table so as to translate each holder from the loading station into a deleafing station, then into a first alignment station, when into a second alignment station, then into the coring station, and then into the unloading station.

29. A coring apparatus, including:

(a) a frame;

(b) a rotary table;

(c) a set of holders mounted around the periphery of the rotary table, where each holder in the set is dimensioned to support an article to be cored;

(d) a drive mechanism coupled to the table for sequentially translating the table and the holders as a unit through a set of stations, including a coring station and an impaling station, along a closed process path;

(e) a rotatable coring knife assembly mounted on the frame in a position above the coring station, and including a pivot arm assembly and a first coring knife mounted on the pivot arm assembly:

(f) a means for rotating the coring knife assembly while pivoting the pivot arm assembly, to translate the first coring knife downward along a coring path each time one of the holders is positioned at the coring station, wherein the first coring knife is capable of severing fragments of each article from a one-piece core of said each article resting in each said one of the holders as the first coring knife translates along the coring path;

(g) an impaling knife slidably attached to each holder so that said impaling knife has a substantially vertical axis; and (h) a means for translating one of the impaling knives upward parallel to said impaling knife's axis each time one of the holders is positioned at the impaling station, in order to impale the core of an article in each said one of the holders.

30. The apparatus of claim 29, wherein each holder includes:

a first shaft attached to the rotary table in a position so that the impaling knife associated with the holder extends through the first tube; a second shaft slidably mounted on the first shaft;

a set of alignment rollers rotatably mounted on the second shaft, each said roller having a threaded surface;

a cam means coupled to the second shaft for translating the second shaft and the set of alignment rollers, as a unit, between a raised position and a lowered position relative to the first shaft; and means coupled to the first holder for rotating the alignment rollers relative to the second shaft, so that as the alignment rollers rotate relative to the second shaft, the alignment rollers' threaded surfaces are capable of rotating an article in the holder into a desired alignment.

31. The apparatus of claim 30, wherein element (d) translates the table so as to translate each holder sequentially into a first alignment station, then into a second alignment station, then into the impaling station, then into the coring station, and then into an unloading station.

* * * * *